(12) United States Patent
Merkel

(10) Patent No.: US 8,389,101 B2
(45) Date of Patent: *Mar. 5, 2013

(54) LANTHANUM-CONTAINING CORDIERITE BODY AND METHOD OF MANUFACTURE

(75) Inventor: Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/785,956

(22) Filed: May 24, 2010

(65) Prior Publication Data

US 2010/0304082 A1 Dec. 2, 2010

Related U.S. Application Data

(60) Provisional application No. 61/182,417, filed on May 29, 2009.

(51) Int. Cl.
*B32B 3/12* (2006.01)
*C04B 35/195* (2006.01)

(52) U.S. Cl. ......... 428/116; 501/152; 501/153; 501/154

(58) Field of Classification Search ................... None
See application file for complete search history.

(56) References Cited

U.S. PATENT DOCUMENTS

| | | | |
|---|---|---|---|
| 4,189,327 A | 2/1980 | Winchester, Jr. | 106/60 |
| 4,225,354 A | 9/1980 | Rao | 106/39.8 |
| 4,235,855 A | 11/1980 | Cleveland | 423/327 |
| 4,476,236 A | 10/1984 | Inoguchi et al. | 501/118 |
| 5,069,697 A | 12/1991 | Hamaguchi et al. | 55/523 |
| 5,549,725 A | 8/1996 | Kasai et al. | 55/523 |
| 6,391,813 B1 * | 5/2002 | Merkel | 501/119 |
| 6,773,481 B2 | 8/2004 | Noguchi et al. | 55/523 |
| 6,808,663 B2 | 10/2004 | Noguchi et al. | 264/44 |
| 7,141,087 B2 | 11/2006 | Noguchi et al. | 55/523 |
| 7,141,089 B2 | 11/2006 | Beall et al. | 55/523 |
| 7,179,316 B2 | 2/2007 | Merket et al. | 55/523 |
| 7,250,384 B2 | 7/2007 | Morimoto et al. | 501/119 |
| 2005/0069469 A1 | 3/2005 | Fu et al. | 422/177 |
| 2007/0119133 A1 | 5/2007 | Beall et al. | 55/523 |
| 2007/0166564 A1 | 7/2007 | Morimoto et al. | 428/593 |
| 2008/0032090 A1 | 2/2008 | Beall et al. | 428/116 |
| 2008/0032091 A1 | 2/2008 | Beall et al. | 428/116 |
| 2008/0057267 A1 | 3/2008 | Brocheton et al. | 428/116 |
| 2008/0057269 A1 | 3/2008 | Faber et al. | 428/116 |
| 2008/0063833 A1 | 3/2008 | Beall et al. | 428/116 |
| 2009/0137382 A1 | 5/2009 | Merkel | |
| 2009/0297764 A1 * | 12/2009 | Beall et al. | 428/116 |

FOREIGN PATENT DOCUMENTS

| | | |
|---|---|---|
| EP | 1333303 | 8/2003 |
| EP | 1666436 | 6/2006 |
| JP | 57-038371 | 3/1982 |
| WO | 96/10203 | 4/1996 |
| WO | 00/28364 | 5/2000 |
| WO | 2005/033037 | 4/2005 |
| WO | 2008/033997 | 3/2008 |
| WO | 2009/005679 | 1/2009 |

* cited by examiner

*Primary Examiner* — David Sample
(74) *Attorney, Agent, or Firm* — Matthew J. Mason; Joseph M. Homa

(57) ABSTRACT

Lanthanum containing cordierite bodies are provided that exhibit high strength, little or no microcracking, and a high thermal shock resistance. Improved maintenance of low microcracking and high strength is obtained even after exposure to high temperatures.

32 Claims, 6 Drawing Sheets

LANTHANUM-CONTAINING CORDIERITE BODY AND METHOD OF MANUFACTURE

CROSS REFERENCE TO RELATED APPLICATION

This application claims the benefit of priority to U.S. Provisional Application No. 61/182,417, filed on May 29, 2009.

FIELD

The present disclosure relates generally to a porous ceramic article, and more particularly to a cordierite ceramic article, such as for use in treatment of exhaust gases such as by particulate filter or catalyst support, and methods for manufacturing such articles.

BACKGROUND

Porous ceramic articles are used in many of applications where chemical inertness, mechanical strength, and high temperature resistance are desirable. In some applications, ceramic honeycomb particulate filters and ceramic honeycomb catalytic supports or substrates can serve in exhaust gas treatment systems.

SUMMARY

Disclosed herein are cordierite bodies exhibiting high strength, low (little or no) micro cracking, and a high thermal shock resistance. In some embodiments, the cordierite bodies maintain low microcracking and high strength after exposure to high temperatures or corrosive solutions. In some embodiments, the cordierite articles have high porosity. Methods for the manufacture of such bodies are also disclosed herein.

In one aspect, a porous cordierite ceramic body is disclosed herein containing at least 0.1% lanthanum oxide and exhibiting high strength, high thermal shock resistance, and little or no microcracking.

In some embodiments, the ceramic body has high thermal shock resistance even with relatively high coefficient of thermal expansion, for example $CTE_{25-800}$ greater than $14.0°\,C.^{-1}$ from 25° C.-800° C. In some embodiments, $CTE_{25-800} \geq 15.0$, $\geq 16.0$, and even $\geq 18.0°\,C.^{-1}$, and yet thermal shock resistance remains high.

In some embodiments, the ceramic body has $E_{800}/E_{25} \leq 1.00$, $\leq 0.95$, and even $\leq 0.94$. In some embodiments, the ceramic body has $E_{900}/E_{25} \leq 0.96$, $\leq 0.92$, $\leq 0.89$, and even $\leq 0.85$. In some embodiments, the ceramic body has $E_{1000}/E_{25} \leq 0.85$, $\leq 0.83$, $\leq 0.810$, $\leq 0.800$, $\leq 0.785$, and even $\leq 0.77$. Lower values of such elastic modulus ratios indicate lower levels of micro cracks.

In another aspect, a porous cordierite ceramic body is disclosed herein containing at least 0.1% lanthanum oxide and possessing low iron content, and/or possessing CaO, which maintains desirable thermophysical properties even after prolonged exposure to heat (for example to a 950° C. environment), and exhibits high strength, high thermal shock resistance, and little or no microcracking even after such heat exposure. We have found that a low $Fe_2O_3$ content, or the presence of CaO, or advantageously and synergistically in some embodiment, both low $Fe_2O_3$ content and the presence of CaO, can provide enhanced preservation of properties even after prolonged exposure to heat.

Various embodiments of the porous cordierite ceramic bodies disclosed herein are especially useful as a honeycomb ceramic article, such as a substrate or a filter (plugged substrate) for use as a catalyst support or particulate filter in hot exhaust gas purification and remediation, or as a filtration membrane support for solid, liquid, or gas separation.

In one set of embodiments, a ceramic body is disclosed herein comprising a predominant cordierite ceramic phase and at least about 0.1 wt % lanthanum oxide contained within the microstructure of the ceramic, the article exhibiting: a four-point beam bending modulus of rupture at 25° C. (room-temperature), MOR; a room-temperature elastic modulus E as measured by a sonic resonance technique at 25° C.; and a coefficient of thermal expansion $CTE_{200-1000}$ from 200° C.-1000° C. in units of $°\,C.^{-1}$; wherein the ceramic body is characterized by a dimensionless strain tolerance, defined by a ratio MOR/E, and a thermal shock resistance, defined by $TSL_{200} = 200°\,C. + (MOR/E)/CTE_{200-1000}$, wherein the ceramic body exhibits $MOR/E > 0.12 \times 10^{-2}$ and $TSL_{200} \geq 900°\,C.$ after being at room temperature and then being subjected to a heat treatment including being exposed to an environment with a temperature in a range of 800° C. to 1100° C. for at least 25 hours. In some embodiments, the heat treatment comprises exposing the ceramic body to either an environment with a temperature of 950° C. for at least 80 hours, or to an environment with a temperature of 1100° C. for at least 80 hours, or to an environment with a temperature of between 800 and 900° C. for at least 20 hours and between 900 and 1000° C. for at least 5 hours and between 1000 and 1100° C. for at least 2 hours. For example, the heat treatment can comprise exposing the ceramic body to either an environment with a temperature of about 950° C. for about 82 hours, or to an environment with a temperature of about 1100° C. for about 82 hours.

In some embodiments, the ceramic body exhibits $MOR/E \geq 0.16 \times 10^{-2}$ after the heat treatment; in some embodiments, the ceramic body exhibits $TSL_{200} \geq 1000°\,C.$ after the heat treatment; and in some embodiments, the ceramic body exhibits $MOR/E \geq 0.16 \times 10^{-2}$ and $TSL_{200} \geq 1000°\,C.$ after the heat treatment. In some embodiments, the ceramic body exhibits $MOR/E \geq 0.18 \times 10^{-2}$ after the heat treatment; in some embodiments, the ceramic body exhibits $TSL_{200} \geq 1100°\,C.$ after the heat treatment; and in some embodiments, the ceramic body exhibits $MOR/E \geq 0.18 \times 10^{-2}$ and $TSL_{200} \geq 1100°\,C.$ after heat treatment. In some embodiments, the ceramic body exhibits $MOR/E \geq 0.20 \times 10^{-2}$ after the heat treatment; in some embodiments, the ceramic body exhibits $TSL_{200} \geq 1200°\,C.$ after the heat treatment; and in some embodiments, the ceramic body exhibits $MOR/E \geq 0.20 \times 10^{-2}$ and $TSL_{200} \geq 1200°\,C.$ after heat treatment.

In some embodiments, the ceramic body exhibits a ratio $MOR_f/MOR_i \geq 0.60$, wherein $MOR_f$ is the MOR after the heat treatment and $MOR_i$ is the MOR at room-temperature before the heat treatment; in other embodiments, $MOR_f/MOR_i \geq 0.80$; and in other embodiments, $MOR_f/MOR_i \geq 0.90$.

In some embodiments, the ceramic body, after being at room temperature and then being subjected to an environment with a temperature of 1100° C. for at least 80 hours, exhibits $MOR/E \geq 0.12 \times 10^{-2}$ and $TSL_{200} \geq 900°\,C.$ In some embodiments, the ceramic body contains 1.0 wt % or less of $Fe_2O_3$.

In some embodiments, the ceramic body contains 0.10 wt % or more of CaO.

In some embodiments, the ceramic body contains 0.60 wt % or less of $Fe_2O_3$ and 0.10 wt % or more of CaO.

In some embodiments, the ceramic body has a honeycomb structure with a plurality of channels, the structure having an end with a frontal open area and a closed frontal area (CFA), and wherein $MOR/CFA \geq \{8700 - 120(\%\ porosity)\}$, in psi, after being at room temperature and then being subjected to the heat treatment, wherein the heat treatment comprises exposing the ceramic body either to air at a temperature of 950° C. for at least 80 hours or to an environment with a temperature of between 800 and 900° C. for at least 20 hours and between 900 and 1000° C. for at least 5 hours and between 1000 and 1100° C. for at least 2 hours. The ceramic body has a total porosity ("% porosity") as measured by mercury porosimetry. In some embodiments, MOR/CFA≧{9000−120(% porosity)}, in psi, after heat treatment. In some embodiments, MOR/CFA≧{9300−120(% porosity)}, in psi, after heat treatment.

In some embodiments, the as-fired ceramic body at room-temperature and prior to the heat treatment exhibits $Nb^3 \leq 0.08$; in other embodiments, the as-fired ceramic body at room-temperature and prior to the heat treatment exhibits $Nb^3 \leq 0.03$, in other embodiments $Nb^3 \leq 0.02$, and in other embodiments $Nb^3 \leq 0.01$.

In some embodiments, the ceramic body exhibits $Nb^3 \leq 0.04$ after the heat treatment.

In some embodiments, the ceramic body has a total porosity of greater than or equal to 50% as measured by mercury porosimetry.

In some embodiments, the ceramic body contains between 0.3 and 5 wt % lanthanum oxide.

In some embodiments, the ceramic body contains between 0.5 and 2 wt % lanthanum oxide.

In another set of embodiments, a ceramic body is disclosed herein comprising a predominant cordierite ceramic phase and at least about 0.1 wt % lanthanum oxide contained within the microstructure of the ceramic, the article exhibiting: a coefficient of thermal expansion $CTE_{25-800}$ greater than $14.0 \times 10^{-7}$ °$C.^{-1}$ from 25° C.-800° C.; an elastic modulus ratio $E_{800}/E_{25} \leq 1.00$; a four-point beam bending modulus of rupture at 25° C. (room-temperature), MOR; and a room-temperature elastic modulus E as measured by a sonic resonance technique at 25° C.; wherein the ratio MOR/E is a dimensionless strain tolerance, and MOR/E≧0.10%. In some embodiments, the value of $CTE_{25-800}$ is at least $16.0 \times 10^{-7}$ °$C.^{-1}$; in other embodiments, the value of $CTE_{25-800}$ is at least $17.0 \times 10^{-7}$ °$C.^{-1}$. In some embodiments, the ceramic body exhibits a coefficient of thermal expansion $CTE_{200-1000}$ from 200° C.-1000° C. in units of °$C.^{-1}$, and a thermal shock resistance greater than or equal to 800° C., wherein the thermal shock resistance is 200° C.+(MOR/E)/$CTE_{200-1000}$; in other embodiments, thermal shock resistance is greater than or equal to 900° C. In some embodiments, the ceramic body exhibits $Nb^3 \leq 0.08$. In some embodiments, the ceramic body has a cellular honeycomb structure. In some embodiments, the ceramic body contains between 0.3 and 5 wt % lanthanum oxide. In some embodiments, the ceramic body has a total porosity of greater than or equal to 50% as measured by mercury porosimetry. In some embodiments, the ceramic body exhibits an elastic modulus ratio $E_{900}/E_{25} \leq 0.96$, and in other embodiments $E_{900}/E_{25} \leq 0.92$. In some embodiments, the ceramic body exhibits an elastic modulus ratio $E_{100}/E_{25} \leq 0.85$, and in other embodiments $E_{1000}/E_{25} \leq 0.83$. In some embodiments, the ceramic body exhibits an XRD "transverse I-ratio" of less than 0.78. In some embodiments, the ceramic body exhibits a transverse I-ratio of not more than 0.74. In some embodiments, the $CTE_{25-800}$ is at least $16.0 \times 10^{-7}$ °$C.^{-1}$.

In another set of embodiments, a ceramic body is disclosed herein comprising a predominant cordierite ceramic phase and at least about 0.1 wt % lanthanum oxide contained within the microstructure of the ceramic, the article exhibiting: a four-point beam bending modulus of rupture at 25° C. (room-temperature), MOR; a room-temperature elastic modulus E as measured by a sonic resonance technique at 25° C.; and a coefficient of thermal expansion $CTE_{200-1000}$ from 200° C.-1000° C. in units of °$C.^{-1}$; wherein the ceramic body is characterized by a dimensionless strain tolerance, defined by a ratio MOR/E, and a thermal shock resistance, defined by a ratio $TSL_{200} = 200°$ C.+(MOR/E)/$CTE_{200-1000}$, wherein the ceramic body exhibits MOR/E>$0.10 \times 10^{-2}$ and $TSL_{200} \geq 800°$ C. after being at room temperature and then being subjected to a heat treatment including being exposed to an environment with a temperature in a range of 800° C. to 1100° C. for at least 25 hours, and wherein the ceramic body contains $Fe_2O_3$ and CaO in a total combined amount of less than 1.40 wt %; in some embodiments, the total combined amount of $Fe_2O_3$ and CaO in the ceramic body is less than 1.35 wt %, in others less than 1.30, in others less than 1.25, and in others less than 1.00 wt %. In some embodiments, the ceramic body contains 1.0 wt % or less of $Fe_2O_3$; in some embodiments, the ceramic body contains 0.05 wt % or more of CaO; and in some embodiments, the ceramic body contains 1.0 wt % or less of $Fe_2O_3$ and 0.10 wt % or more of CaO. In some embodiments, the ceramic body contains 0.60 wt % or less of $Fe_2O_3$ and 0.10 wt % or more of CaO. In some embodiments, the ceramic body after the heat treatment exhibits $Nb^3 \leq 0.10$; in some embodiments, the ceramic body after the heat treatment exhibits $Nb^3 \leq 0.08$. In some embodiments, the heat treatment comprises exposing the ceramic body to either an environment with a temperature of 950° C. for at least 80 hours, or to an environment with a temperature of 1100° C. for at least 80 hours, or to an environment with a temperature of between 800 and 900° C. for at least 20 hours and between 900 and 1000° C. for at least 5 hours and between 1000 and 1100° C. for at least 2 hours. For example, the heat treatment can comprise exposing the ceramic body to either an environment with a temperature of about 950° C. for about 82 hours, or to an environment with a temperature of about 1100° C. for about 82 hours.

DETAILED DESCRIPTION

Figure 1:
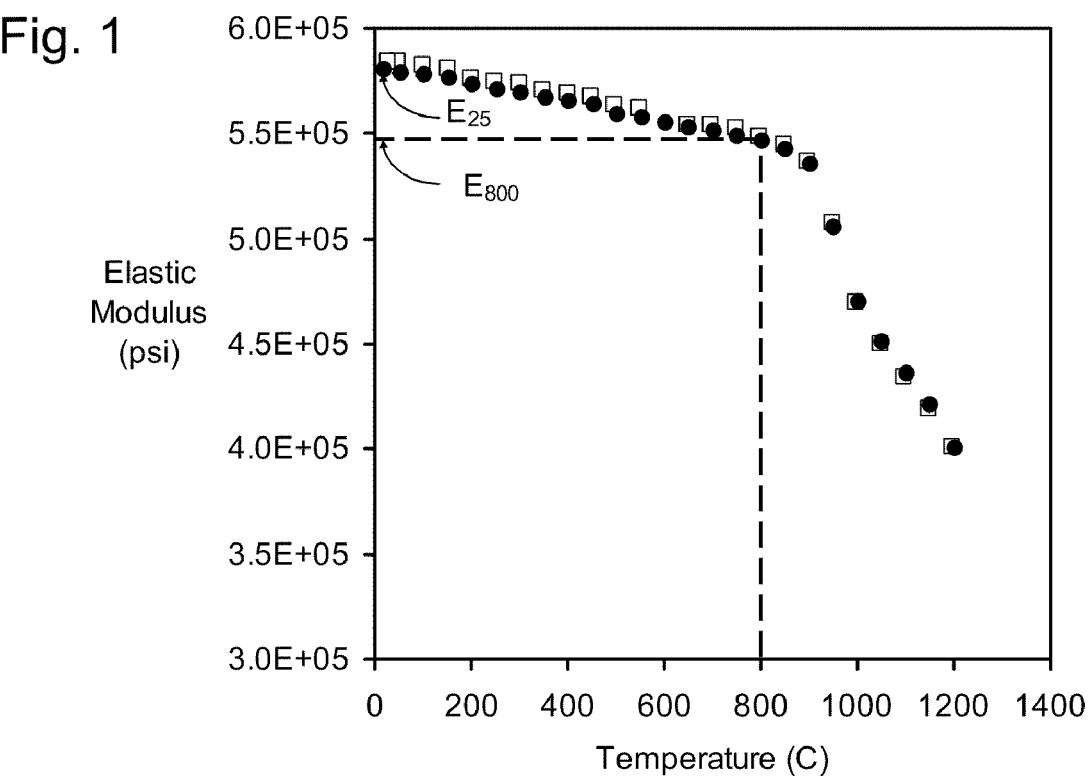
FIG. 1 is an illustration of the elastic modulus, E (psi), plotted against temperature (° C.), of an embodiment disclosed herein having essentially zero microcracking.

A porous ceramic honeycomb article is disclosed herein exhibiting a composition comprising a predominant phase of cordierite, and at least about 0.1 wt % of lanthanum oxide ($La_2O_3$) within the microstructure of the honeycomb. By way of clarification, $La_2O_3$ is included within the wall of the honeycomb structure and is not within an after-applied washcoat.

Porous cordierite ceramic bodies disclosed herein preferably have a high thermal shock resistance and little or no microcracking. In some embodiments, the ceramic bodies have the following attributes: a chemical composition containing at least 0.10 wt % lanthanum oxide; a ratio of MOR/E of at least $0.10 \times 10^{-2}$; a predicted thermal shock limit defined as $[200+(MOR/E)(CTE_{200\text{-}1000})^{-1}]$ of at least 800° C.; and an elastic modulus ratio $E_{800}/E_{25} \leq 1.00$, or a microcrack parameter $Nb^3 \leq 0.08$. In some embodiments, the ceramic bodies have the following attributes: a chemical composition containing at least 0.10 wt % lanthanum oxide; a ratio of MOR/E of at least $0.09 \times 10^{-2}$; a predicted thermal shock limit defined as $[200+(MOR/E)(CTE_{200\text{-}1000})^{-1}]$ of at least 800° C.; and a microcrack parameter $Nb^3$ less than 0.10, and in some of these embodiments less than 0.08. In some embodiments, the ceramic bodies have the following attributes: a chemical composition containing at least 0.10 wt % lanthanum oxide; a ratio of MOR/E of at least $0.12 \times 10^{-2}$; a predicted thermal shock limit defined as $[200+(MOR/E)(CTE_{200\text{-}1000})^{-1}]$ of at least 900° C.; and an elastic modulus ratio $E_{800}/E_{25} \leq 1.00$, or a microcrack parameter $Nb^3 \leq 0.08$.

Embodiments of the porous cordierite ceramic body disclosed herein can be especially useful as a cellular ceramic article, such as a honeycomb, for use as a catalyst substrate or particulate filter in hot exhaust gas purification and remediation, or as a filtration membrane support for solid, liquid, or gas separation.

In some embodiments, the amount of $La_2O_3$ present is $\geq 0.30$ wt %, $\geq 0.50$ wt %, $\geq 0.75$ wt %, or even $\geq 1.0$ wt %. In some embodiments, the $La_2O_3$ is present in an amount between 0.3 and 5 wt %, and in other embodiments between 0.5 and 2 wt %.

In some embodiments, the value of MOR/E is $\geq 0.12 \times 10^{-2}$, $\geq 0.14 \times 10^{-2}$, $\geq 0.16 \times 10^{-2}$, $\geq 0.18 \times 10^{-2}$, $\geq 0.20 \times 10^{-2}$, $\geq 0.22 \times 10^{-2}$, $\geq 0.24 \times 10^{-2}$, or even $\geq 0.26 \times 10^{-2}$. Unless specified otherwise herein, MOR is the room-temperature modulus of rupture as measured by the four-point beam bending method. For a ceramic body or ceramic article comprising parallel channels, such as a honeycomb structure, the MOR is measured on a bar parallel to the direction of the channels (axial direction). In the term MOR/E, E is the room-temperature elastic modulus as measured by a sonic resonance technique using a bar of the same structure as that for which MOR is measured. Thus, MOR and E are either both measured on non-cellular bars, or they are both measured on cellular bars having essentially the same number of channels per unit cross sectional area, essentially the same channel width, and essentially the same wall thickness, allowing for slight differences between specimens cut from the same ceramic article. When the bar is of a cellular structure, the elastic modulus is also measured along the axial direction of the specimen. Typical specimen dimensions for elastic modulus measurement are approximately 1 inch wide, 0.5 inch thickness, and 5 inches in length. Modulus of rupture may be measured on a bar of similar size, or of a smaller size, such as 0.5 inch wide, 0.25 inch thickness, and 2.5 inches in length.

In some embodiments, the predicted thermal shock limit, or thermal shock resistance, $TSL_{200}$, is $\geq 1000°$ C., $\geq 1050°$ C., $\geq 1100°$ C., $\geq 1150°$ C., $\geq 1200°$ C., $\geq 1300°$ C., or even $\geq 1400°$ C. The value of $TSL_{200}$ represents an estimate of the maximum temperature at one location on, or within, the ceramic part which the part can withstand without fracturing when the coolest temperature at a second location on, or within, the ceramic part is 200° C. The value of the coefficient of thermal expansion, CTE, is determined by high-temperature dilatometry on a specimen cut parallel to the length of the specimens used for measurement of MOR and elastic modulus. When the body or article has a cellular structure, the CTE is measured along the axial direction. In calculating $TSL_{200}$, $CTE_{200\text{-}1000}$ is the mean coefficient of thermal expansion as measured between 200 and 1000° C. during heating of the specimen, and is computed as $CTE_{200\text{-}1000} = [(\Delta L_{200}/L) - (\Delta L_{1000}/L)]/800$, where $\Delta L_{200}$ and $\Delta L_{1000}$ are the changes in length of the specimen upon heating from room temperature to 200 and to 1000° C., respectively, and L is the original length of the specimen at room temperature.

In some embodiments, the microcrack index, $Nb^3$, is $\leq 0.08$, $\leq 0.05$, $\leq 0.04$, $\leq 0.03$, $\leq 0.02$, and even $\leq 0.01$. The microcrack index is defined by the relation $Nb^3 = (9/16)[(E°_{25}/E_{25}) - 1]$, where $E°_{25}$ is the room-temperature elastic modulus of the ceramic in a hypothetical state of zero microcracking, determined by extrapolation to 25° C. of a tangent to the curve constructed through the elastic modulus data measured during cooling from 1200° C., as described in United States Patent Application Number 2008/0032091(A1). A low value of $Nb^3$ corresponds to a low degree of microcracking. (See also FIGS. 1 and 2)

In some embodiments, the elastic modulus ratio $E_{800}/E_{25}$ is $\leq 0.99$, $\leq 0.98$, $\leq 0.97$, $\leq 0.96$, and even $\leq 0.95$. The value of $E_{800}$ is the elastic modulus at 800° C. as measured upon heating, and the value of $E_{25}$ is the elastic modulus as measured near room temperature prior to heating, both as measured using a sonic resonance technique. Low values of $E_{800}/E_{25}$ have been found to correspond to low degrees of microcracking (see FIG. 3).

The modulus of rupture strength of the ceramic article, MOR, divided by the closed frontal area fraction of the article, CFA, is a measure of the intrinsic strength of the porous walls that comprise the article when the article possesses a cellular geometry, such as a honeycomb structure. In some embodiments, the value of MOR/CFA (psi) is $\geq 17,250-260$(% porosity), and in other embodiments $\geq 17,500-260$(% porosity), and in other embodiments $\geq 17,750-260$(% porosity), and in other embodiments $\geq 18,000-260$(% porosity). For a cellular body, the closed frontal area fraction, also known as closed frontal area, is the fractional area of the face of the cellular article comprised of the porous ceramic walls. For example, when the article is a honeycomb with square channels, the closed frontal area fraction of the face of the honeycomb is defined as $CFA = (w/1000)[2(N^{-0.5}) - (w/1000)](N)$, where w is the wall thickness in units mils ($10^{-3}$ inches) and N is the cell density in units of inches$^{-2}$. When the ceramic article is a solid body without channels, the value of $CFA = 1.0$ and MOR/CFA is equal to the MOR as measured on the solid bar. An alternative method for determining the CFA for a cellular body, which does not rely upon measurement of cell density and wall thickness using a microscope, is to measure the external dimensions of a bar-shaped specimen cut parallel to the channel axes and compute its external volume, weigh the specimen, and calculate the bulk density of the specimen equal to the specimen weight divided by the specimen volume. The density of the bar is related to the closed frontal area of the sample and the percent porosity of the walls such that CFA can be calculated form the relation CFA=(bulk specimen density)/{(theoretical density of the sample at zero porosity)[1−(% porosity/100)]}. In keeping with the embodiments disclosed herein, the theoretical density of the sample at zero porosity is taken to be the density of a cordierite crystal, equal to 2.51 g/cm$^2$. This method of computing CFA is useful because it is independent of the shape of the channels (square, hexagonal, round, etc.).

In some embodiments, the porosity is ≧50%, ≧52%, ≧54%, ≧56%, ≧58%, ≧60%, or even ≧62%. The median pore diameter, $d_{50}$, may be adjusted to suit the desired application by controlling the particle size of the inorganic raw materials and fugitive pore-forming agents. When the article is a honeycomb flow-through catalytic substrate, $d_{50}$ is in some embodiments ≧0.5 μm and ≦7 μm, in other embodiments ≧1 μm and ≦5 μm, and in other embodiments ≧1.5 μm and ≦4 μm. When the article is to be used as a wall-flow particulate filter, $d_{50}$ may be ≧7 and ≦13 μm, or ≧8 and ≦11 μm, for example when very high filtration efficiency is required, or when the channel wall is thin, or when catalyst, if present, is applied at a low loading. Alternatively, the value of $d_{50}$ may be ≧13 μm and ≦30 μm, or ≧15 μm and ≦25 μm, or even ≧17 μm and ≦22 μm, such as when the article is to be used as a wall-flow particulate filter having, for example, thicker walls or a higher loading of catalyst. The values of % porosity and $d_{50}$ are determined by mercury porosimetry. Unless otherwise specified herein, porosity refers to total porosity.

In some embodiments, the value of $d_f=(d_{50}-d_{10})/d_{50}$ is ≦0.45, ≦0.40, ≦0.35, ≦0.30, or even ≦0.25. In some embodiments, the value of $d_b=(d_{90}-d_{10})/d_{50}$ is ≦1.00, ≦0.90, ≦0.80, ≦0.70, or even ≦0.60. Low values of $d_f$ and $d_b$ correspond to a narrow pore size distribution, which is beneficial for high pore connectivity, high MOR/E, and high thermal shock resistance. A narrow pore size distribution is of further benefit for minimizing pressure drop when the article disclosed herein is used as a filter or filtration membrane support, especially when the filter is partially loaded with collected particulate matter. In some embodiments, the value of the Fine Pore Connectivity Factor, $PCF_f$, defined as % porosity/$d_f$, is ≧140, ≧160, ≧180, ≧200, ≧220, and even ≧240. In some embodiments, the value of the Full-Breadth Pore Connectivity Factor, $PCF_b$, defined as % porosity/$d_b$, is ≧50, ≧60, ≧70, ≧80, ≧90, and even ≧100. High values of $PCF_f$ and $PCF_b$ tend to result in high values of MOR/E and high $TSL_{200}$. The terms $d_{10}$, $d_{50}$, and $d_{90}$ denote the pore diameters, in microns, or micrometers ($10^{-6}$ meters), at which 10%, 50%, and 90% of the total pore volume are of a finer pore diameter. Thus, for example, $d_{90}$ is the pore diameter at which 90% (by volume) of the pores are of a smaller diameter (equal to the pore diameter at which the cumulative mercury intrusion volume equals 10% of the total mercury intrusion volume). It therefore follows that, for example, $d_{10}<d_{50}<d_{90}$.

For some embodiments of articles with a honeycomb structure, the value of the cordierite transverse I-ratio is ≧0.70, ≧0.72, ≧0.74, ≧0.76, or nd even ≧0.78. The transverse I-ratio is as measured by x-ray diffractometry on the as-fired surface of the channel wall, as described in United States Patent Application Publication Number 2008/0032091. In some embodiments disclosed herein, the XRD transverse I-ratio isles than 0.78, and in some embodiments is not more than 0.74. In some embodiments, the axial I-ratio of the cellular article is ≦0.60, ≦0.58, ≦0.56, ≦0.54, ≦0.52, or nd even ≦0.50. The axial I-ratio is as measured by x-ray diffractometry on the cross section of the channel walls taken orthogonal to the axial direction of the specimen. A high value for the transverse I-ratio and a low value for the axial I-ratio indicate preferred textural orientation of the cordierite crystallites with their negative thermal expansion z-axes aligned near the plane of the channel wall, which imparts a lower bulk coefficient of thermal expansion to the honeycomb body in the axial direction and in the radial direction, thereby increasing the thermal shock resistance of the ceramic body.

In some embodiments, the total amount of mullite+spinel+sapphirine+corundum in the fired ceramic, as measured by x-ray diffractometry, is ≦4.0%, ≦3.0%, and even ≦2.0%, as large amounts of these phases increase the CTE of the ceramic and lower its thermal shock resistance.

In one aspect, we have found that embodiments disclosed herein of cordierite ceramic bodies maintain a high strength and high thermal shock resistance even after heat treatment (after prolonged exposure to high temperatures), such as being exposed to an environment with a temperature of at least 800° C. for at least 25 hours, for example at 950° C. for at least 80 hours or between 800 and 900° C. for at least 20 hours and between 900 and 1000° C. for at least 5 hours and between 1000 and 1100° C. for at least 2 hours. We have found that such bodies also tend to maintain a very low degree of microcracking and high strain tolerance, MOR/E, after heat treatment or high temperature exposure. Without the need to rely on theory, it is believed that cordierite ceramic bodies disclosed herein which maintain the desired thermophysical properties after high temperature exposure also undergo less devitrification of the intercrystalline glass phase between the cordierite crystallites during prolonged heating (see FIGS. 10 and 11). We have also found that lanthanum-containing cordierite ceramic bodies as disclosed herein are most resistant to devitrification of the intercrystalline glass phase when the amount of iron impurity in the bulk ceramic body is low. Furthermore, when the iron content of the ceramic is low, it is still further desirable that the body contains at least some minimum amount of calcium, as set forth below. (See FIGS. 4 to 6)

In order to maintain the highest MOR and $TSL_{200}$ after high-temperature exposure, the amount of $Fe_2O_3$ in some bodies disclosed herein is 1.0 wt %, or the amount of CaO is 0.02 wt %, or preferably the amount of $Fe_2O_3$ in the bodies disclosed herein is preferably 1.0 wt % and the amount of CaO is preferably 0.02 wt %, as this combination provides for high MOR, high MOR/E, low microcracking, and high $TSL_{200}$ after prolonged heat treatment at high temperatures, such as at 950° C. In some of these embodiments, the amount of $Fe_2O_3$ is preferably ≦0.80 wt % and the amount of CaO is ≧0.05 wt %. In some of these embodiments, the amount of $Fe_2O_3$ is ≦0.50 wt % and that the amount of CaO is ≧0.07 wt %, and in other embodiments the amount of $Fe_2O_3$ is ≦0.60 wt % and the amount of CaO is ≧0.10 wt %, which provided for particularly low microcracking, high MOR/E, and high $TSL_{200}$ after prolonged heat treatment at high temperatures, such as at 950° C.

In some embodiments, the thermal shock limit, $TSL_{200}$, after exposure to 950° C. for at least 80 hours in air is preferably ≧1000° C., more preferably ≧1050° C., ≧1100° C., ≧1150° C., and even ≧1200° C.

In some embodiments, the value of MOR/CFA after exposure to 950° C. for at least 80 hours in air is ≧1200 psi, ≧1600 psi, ≧2000 psi, ≧2400 psi, or even ≧2800 psi.

In some embodiments, the value of the microcrack index, $Nb^3$, after exposure to 950° C. for at least 80 hours in air is $\leq 0.030$, $\leq 0.020$, or even $\leq 0.010$. In some embodiments, the value of the elastic modulus ratio, $E_{800}/E_{25}$, after exposure to 950° C. for at least 80 hours in air is preferably $\leq 0.97$, more preferably $\leq 0.96$, and even more preferably $\leq 0.95$.

In some embodiments, the value of MOR/E after exposure to 950° C. for at least 80 hours in air is preferably $\geq 0.15 \times 10^{-2}$, more preferably $\geq 0.16 \times 10^{-2}$, $\geq 0.17 \times 10^{-2}$, $\geq 0.18 \times 10^{-2}$, $\geq 0.19 \times 10^{-2}$, $\geq 0.20 \times 10^{-2}$, and even $\geq 0.22 \times 10^{-2}$.

In accordance with another aspect disclosed herein, a method is provided for forming porous cordierite ceramic honeycomb bodies possessing little or no microcracking, by (1) forming an inorganic raw material mixture selected from a magnesium source, an aluminum source, a silicon source, and a lanthanum source sufficient to provide at least 0.10 wt % $La_2O_3$ to the inorganic mixture; (2) mixing the inorganic raw materials with a binder and liquid vehicle and, optionally, a pore-forming agent; (3) shaping the raw material mixture into a body; and (4) firing the body at a sufficiently high temperature and for a sufficient length of time to produce a substantially cordierite ceramic body having a ratio of MOR/$E \geq 0.10 \times 10^{-2}$, an elastic modulus ratio $E_{800° C.}/E_{25° C.}$ of $\leq 1.00$ or a microcrack parameter $Nb^3 \leq 0.08$, and a predicted thermal shock limit, $TSL_{200}$, defined as $[200+(MOR/E)(CTE_{200-1000})^{-1}]$ of at least 800° C.

Magnesium sources include talc, calcined talc, chlorite, magnesium oxide, magnesium hydroxide, magnesium carbonate, and magnesium aluminate spinel, or combinations thereof. Sources of aluminum include kaolin, calcined kaolin, pyrophyllite, sillimanite, mullite, kyanite, boehmite, diaspore, aluminum hydroxide (also known as aluminum trihydrate), transition aluminas such as gamma-alumina, and corundum, or combinations thereof. Sources of silica include quartz, Tripoli silica, and amorphous silica including fused silica, or combinations thereof. In some embodiments, the raw material mixture is selected to provide an amount of $Fe_2O_3$ that is preferably $\leq 0.80$ wt % and an amount of CaO that is preferably $\geq 0.05$ wt %, or more preferably $Fe_2O_3 \leq 0.60$ wt % and $CaO \geq 0.10$ wt %. The amount of $Fe_2O_3$ provided is more preferably $\leq 0.50$ wt % and the amount of CaO is more preferably $\geq 0.07$ wt %. It is further preferred that the amount of $Fe_2O_3$ provided is $\leq 0.30$ wt % and the amount of CaO is $\geq 0.10$ wt %. The raw material mixture may optionally include a calcium source, such as, for example, wollastonite, dolomite, or calcium carbonate, or combinations thereof.

In one set of embodiments, the batch material includes at least 8 wt % of kaolin or calcined kaolin, and at least 8% of a magnesium source having a median particle diameter of $\leq 10$ µm, and preferably $\leq 5$ µm or even $\leq 3$ µm, wherein the magnesium source is selected from magnesium oxide, magnesium hydroxide, magnesium carbonate, or magnesium aluminate spinel.

Several non-limiting examples are set forth below.

Raw materials used to make the examples are provided in Table 1, together with their median particle diameters as measured by a Microtrac particle size analyzer, using a laser diffraction technique.

TABLE 1

Raw material sources and particle sizes

| Raw Material | $D_{10}$ Particle Diameter (microns) | $D_{50}$ = Median Particle Diameter (microns) | $D_{90}$ Particle Diameter (microns) |
|---|---|---|---|
| Talc A | 9.4 | 24 | 47 |
| Talc B | 4.4 | 9.7 | 19 |
| Talc C | 2.4 | 5.5 | 12 |
| Talc D | 5.1 | 16 | 34 |
| Chlorite | 5.1 | 18 | 38 |
| Magnesium Hydroxide | 1.0 | 0.8 | 9.5 |
| Spinel | 2.0 | 7.4 | 15 |
| Alumina A | 3.3 | 6.6 | 20 |
| Alumina B | 1.0 | 3.4 | 6.5 |
| Alumina C | 0.2 | 0.5 | 2.3 |
| Alumina D | 5.6 | 12 | 25 |
| Boehmite | 0.05 | 0.13 | 3.6 |
| Kaolin | 2.4 | 7.3 | 17.2 |
| Quartz | 1.1 | 4.5 | 18 |
| Attapulgite | — | 2.0 × 0.003 | — |
| Bentonite A | 2.3 | 11 | 137 |
| Bentonite B | 0.8 | 2.6 | 14 |
| Lanthanum Oxide | 3.2 | 8.7 | 20 |
| Iron (III) Oxide | — | — | — |
| Calcium Carbonate | 1.0 | 2.4 | 4.4 |
| Titanium Dioxide | 0.14 | 0.34 | 0.84 |
| Graphite A | 7.4 | 38 | 71 |
| Graphite B | 4.0 | 8.8 | 17 |
| Walnut Shell Flour A | 9.4 | 29 | 63 |
| Walnut Shell Flour B | | 21 | |
| Walnut Shell Flour C | 29 | 42 | 78 |
| Walnut Shell Flour D | | | |
| Rice Starch | 3.2 | 4.7 | 6.6 |
| Methyl Cellulose | — | — | — |
| Tall Oil Fatty Acid | — | — | — |
| Hydrogenated Dimeric 1-Decene | — | — | — |
| Sodium Stearate | — | — | — |

The metal oxide components of most inorganic raw materials, as analyzed by x-ray fluorescence spectroscopy, flame emission spectroscopy, or inductively or direct coupled plasma spectrometry, are provided in Table 2.

TABLE 2

Chemical compositions of raw materials

| | Wt % MgO | Wt % $Al_2O_3$ | Wt % $SiO_2$ | Wt % $Fe_2O_3$ | Wt % $TiO_2$ | Wt % $Na_2O$ | Wt % $K_2O$ | Wt % CaO | Wt % NiO | Wt % $P_2O_5$ | LOI @ 1000° C. |
|---|---|---|---|---|---|---|---|---|---|---|---|
| Talc A | 30.14 | 0.19 | 60.60 | 2.32 | 0.00 | 0.010 | 0.00 | 0.120 | 0.48 | 0.00 | 5.40 |
| Talc B | 30.13 | 0.19 | 59.40 | 2.55 | 0.00 | 0.010 | 0.00 | 0.230 | 0.45 | 0.00 | 6.30 |
| Talc C | 30.17 | 0.09 | 60.60 | 2.16 | 0.00 | 0.010 | 0.00 | 0.180 | 0.50 | 0.00 | 5.50 |
| Talc D | 31.31 | 0.85 | 60.60 | 1.02 | 0.050 | 0.040 | 0.00 | 0.160 | 0.00 | 0.00 | 5.30 |
| Chlorite | 32.80 | 21.00 | 31.20 | 0.19 | 0.110 | 0.015 | 0.004 | 0.013 | 0.00 | 0.00 | 14.50 |
| Magnesium Hydroxide | 68.21 | 0.09 | 0.29 | 0.14 | 0.006 | 0.000 | 0.00 | 0.760 | 0.00 | 0.00 | 30.49 |
| Spinel | 22.60 | 76.10 | 0.31 | 0.13 | 0.00 | 0.21 | 0.00 | 0.32 | 0.00 | 0.00 | 0.00 |
| Alumina A | 0.00 | 99.90 | 0.008 | 0.014 | 0.00 | 0.067 | 0.005 | 0.010 | 0.00 | 0.00 | 0.00 |
| Alumina B | 0.00 | 99.87 | 0.015 | 0.011 | 0.00 | 0.067 | 0.005 | 0.029 | 0.00 | 0.00 | 0.00 |
| Alumina C | 0.044 | 99.80 | 0.037 | 0.013 | 0.00 | 0.061 | 0.010 | 0.035 | 0.00 | 0.00 | 0.00 |
| Alumina D | 0.00 | 99.90 | 0.036 | 0.014 | 0.00 | 0.015 | 0.005 | 0.033 | 0.00 | 0.00 | 0.00 |

TABLE 2-continued

Chemical compositions of raw materials

|  | Wt % MgO | Wt % Al$_2$O$_3$ | Wt % SiO$_2$ | Wt % Fe$_2$O$_3$ | Wt % TiO$_2$ | Wt % Na$_2$O | Wt % K$_2$O | Wt % CaO | Wt % NiO | Wt % P$_2$O$_5$ | LOI @ 1000° C. |
|---|---|---|---|---|---|---|---|---|---|---|---|
| Boehmite | 0.00 | 79.99 | 0.00 | 0.00 | 0.00 | 0.004 | 0.005 | 0.00 | 0.00 | 0.00 | 20.00 |
| Kaolin | 0.07 | 38.18 | 45.10 | 0.21 | 0.99 | 0.07 | 0.04 | 0.05 | 0.00 | 0.05 | 14.20 |
| Quartz | 0.008 | 0.260 | 99.52 | 0.047 | 0.018 | 0.076 | 0.042 | 0.009 | 0.00 | 0.019 | 0.00 |
| Attapulgite | 10.47 | 9.57 | 50.90 | 2.97 | 0.35 | 0.58 | 0.58 | 2.20 | 0.00 | 0.00 | 21.50 |
| Bentonite A | 2.07 | 15.53 | 60.40 | 3.93 | 0.16 | 2.23 | 0.44 | 1.51 | 0.00 | 0.08 | 11.80 |
| Bentonite B | 2.12 | 15.62 | 70.00 | 4.00 | 0.16 | 2.21 | 0.40 | 1.38 | 0.00 | 0.08 | 11.20 |
| Graphite (A, B) | 0.00 | 0.047 | 0.092 | 0.500 | 0.019 | 0.00 | 0.00 | 0.025 | 0.00 | 0.00 | 99.32 |
| Walnut Shell Flour (A, B, C, D) | 0.040 | 0.00 | 0.015 | 0.00 | 0.00 | 0.002 | 0.002 | 0.154 | 0.00 | 0.032 | 99.75 |
| Rice Starch | 0.013 | 0.00 | 0.012 | 0.00 | 0.00 | 0.116 | 0.016 | 0.002 | 0.00 | 0.099 | 99.74 |
| Sodium Stearate | 0.00 | 0.00 | 0.00 | 0.00 | 0.00 | 10.11 | 0.00 | 0.00 | 0.00 | 0.00 | 89.89 |

The batch compositions for the examples are listed in Tables 3 to 8.

TABLE 3

Parts by weight of raw material constituents and calculated chemical compositions of examples

| Composition | A | B | C | D | E | F | G | H |
|---|---|---|---|---|---|---|---|---|
| Chlorite | 39.52 | 39.52 | 39.52 | 39.52 | 39.52 | 39.52 | 39.52 | 39.52 |
| Alumina A | 24.49 | 24.49 | 24.49 | 24.49 | 24.49 | 24.49 | 24.49 | 24.49 |
| Quartz | 35.98 | 35.98 | 35.98 | 35.98 | 35.98 | 35.98 | 35.98 | 35.98 |
| Iron Oxide | — | — | — | — | 1.00 | 1.00 | 1.00 | 1.00 |
| Calcium Carbonate | — | 0.20 | — | 0.20 | — | — | 0.20 | 0.20 |
| Titanium Dioxide | — | — | 0.10 | 0.10 | — | 0.10 | — | 0.10 |
| Lanthanum Oxide | 1.00 | 1.00 | 1.00 | 1.00 | 1.00 | 1.00 | 1.00 | 1.00 |
| Graphite A | 20.00 | 20.00 | 20.00 | 20.00 | 20.00 | 20.00 | 20.00 | 20.00 |
| Walnut Shell Flour A | 30.00 | 30.00 | 30.00 | 30.00 | 30.00 | 30.00 | 30.00 | 30.00 |
| Methyl Cellulose | 6.0 | 6.0 | 6.0 | 6.0 | 6.0 | 6.0 | 6.0 | 6.0 |
| Sodium Stearate | 1.0 | 1.0 | 1.0 | 1.0 | 1.0 | 1.0 | 1.0 | 1.0 |
| Calculated ceramic composition (wt %) | | | | | | | | |
| MgO | 13.60 | 13.59 | 13.59 | 13.57 | 13.46 | 13.45 | 13.44 | 13.43 |
| Al$_2$O$_3$ | 34.41 | 34.37 | 34.37 | 34.33 | 34.05 | 34.02 | 34.01 | 33.98 |
| SiO$_2$ | 50.42 | 50.36 | 50.37 | 50.31 | 49.90 | 49.85 | 49.84 | 49.79 |
| Fe$_2$O$_3$ | 0.204 | 0.204 | 0.204 | 0.203 | 1.237 | 1.236 | 1.236 | 1.235 |
| TiO$_2$ | 0.056 | 0.056 | 0.161 | 0.161 | 0.056 | 0.159 | 0.056 | 0.159 |
| Na$_2$O | 0.158 | 0.158 | 0.158 | 0.158 | 0.157 | 0.157 | 0.157 | 0.156 |
| K$_2$O | 0.019 | 0.019 | 0.019 | 0.019 | 0.019 | 0.019 | 0.019 | 0.019 |
| CaO | 0.065 | 0.182 | 0.065 | 0.182 | 0.064 | 0.064 | 0.180 | 0.180 |
| NiO | 0.000 | 0.000 | 0.000 | 0.000 | 0.000 | 0.000 | 0.000 | 0.000 |
| P$_2$O$_5$ | 0.017 | 0.017 | 0.017 | 0.017 | 0.017 | 0.017 | 0.017 | 0.017 |
| La$_2$O$_3$ | 1.046 | 1.045 | 1.045 | 1.044 | 1.036 | 1.035 | 1.034 | 1.033 |

TABLE 4

Parts by weight of raw material constituents and calculated chemical compositions of examples

| | Composition | | | | |
|---|---|---|---|---|---|
| | I | J | K | M | N |
| Talc D | 42.38 | 42.38 | — | — | — |
| Talc B | — | — | 42.38 | 42.38 | 42.38 |
| Alumina A | 30.12 | 30.12 | 30.12 | 30.12 | 30.12 |
| Boehmite | 5.00 | 5.00 | 5.00 | 5.00 | 5.00 |
| Quartz | 23.50 | 23.50 | 23.50 | 23.50 | 23.50 |
| Bentonite A | — | 5.00 | — | 5.00 | — |
| Attapulgite | — | — | — | — | 5.00 |
| Lanthanum Oxide | 1.00 | 1.00 | 1.00 | 1.00 | 1.00 |
| Walnut Shell Flour A | 40.00 | 40.00 | 40.00 | 40.00 | 40.00 |
| Methyl Cellulose | 6.00 | 6.00 | 6.00 | 6.00 | 6.00 |
| Sodium Stearate | 1.00 | 1.00 | 1.00 | 1.00 | 1.00 |
| Calculated ceramic composition (wt %) | | | | | |
| MgO | 13.52 | 13.04 | 13.06 | 12.60 | 13.08 |
| Al$_2$O$_3$ | 34.88 | 34.16 | 34.75 | 34.03 | 33.89 |
| SiO$_2$ | 49.78 | 50.62 | 49.46 | 50.32 | 50.08 |
| Fe$_2$O$_3$ | 0.455 | 0.629 | 1.119 | 1.265 | 1.223 |
| TiO$_2$ | 0.026 | 0.033 | 0.004 | 0.012 | 0.021 |
| Na$_2$O | 0.159 | 0.262 | 0.147 | 0.250 | 0.170 |
| K$_2$O | 0.013 | 0.034 | 0.013 | 0.034 | 0.041 |
| CaO | 0.136 | 0.205 | 0.167 | 0.234 | 0.269 |
| NiO | 0.000 | 0.000 | 0.195 | 0.186 | 0.187 |

TABLE 4-continued

Parts by weight of raw material constituents and calculated chemical compositions of examples

| | Composition | | | | |
|---|---|---|---|---|---|
| | I | J | K | M | N |
| $P_2O_5$ | 0.022 | 0.025 | 0.017 | 0.021 | 0.017 |
| $La_2O_3$ | 1.011 | 0.968 | 1.015 | 0.972 | 0.976 |

TABLE 5

Parts by weight of raw material constituents and calculated chemical compositions of examples

| | Composition | | | | |
|---|---|---|---|---|---|
| | O | P | Q | R | S |
| Talc D | — | 14.35 | — | 23.47 | — |
| Talc A | — | — | — | — | 23.47 |
| Talc B | 14.35 | — | 23.47 | — | — |
| Spinel | — | — | 25.00 | 25.00 | 25.00 |
| Magnesium Hydroxide | 12.00 | 12.00 | — | — | — |
| Alumina A | 26.23 | 26.23 | 9.34 | 9.34 | 9.34 |
| Alumina B | — | — | — | — | — |
| Boehmite | — | — | — | — | — |
| Kaolin | 16.00 | 16.00 | 16.00 | 16.00 | 16.00 |
| Quartz | 31.42 | 31.42 | 26.12 | 26.12 | 26.12 |
| Bentonite B | — | — | — | 1.00 | 1.00 |
| Lanthanum Oxide | 1.00 | 1.00 | 1.00 | 1.00 | 1.00 |
| Graphite A | — | — | 30.00 | 20.00 | 25.00 |
| Graphite B | 15.00 | 15.00 | — | — | — |
| Walnut Shell Flour A | — | — | 30.00 | 20.00 | 25.00 |
| Walnut Shell Flour B | — | — | — | — | — |
| Rice Starch | 15.00 | 15.00 | — | — | — |
| Methyl Cellulose | 6.0 | 6.0 | 6.00 | 6.00 | 6.00 |
| Sodium Stearate | — | — | 1.00 | 1.00 | 1.00 |
| Tall oil | 0.6 | 0.6 | — | — | — |
| Durasyn ® 162 | 4.6 | 4.6 | — | — | — |
| Calculated ceramic composition (wt %) | | | | | |
| MgO | 13.31 | 13.48 | 13.13 | 13.30 | 13.02 |
| $Al_2O_3$ | 34.48 | 34.52 | 35.60 | 35.52 | 35.36 |
| $SiO_2$ | 50.06 | 50.17 | 48.63 | 49.06 | 49.07 |
| $Fe_2O_3$ | 0.544 | 0.309 | 0.853 | 0.465 | 0.802 |
| $TiO_2$ | 0.180 | 0.187 | 0.175 | 0.185 | 0.173 |
| $Na_2O$ | 0.076 | 0.080 | 0.199 | 0.225 | 0.218 |
| $K_2O$ | 0.025 | 0.025 | 0.019 | 0.023 | 0.023 |
| CaO | 0.151 | 0.140 | 0.206 | 0.182 | 0.182 |
| NiO | 0.069 | 0.000 | 0.109 | 0.000 | 0.115 |
| $P_2O_5$ | 0.031 | 0.032 | 0.023 | 0.023 | 0.022 |
| $La_2O_3$ | 1.061 | 1.059 | 1.025 | 1.015 | 1.014 |

TABLE 6

Parts by weight of raw material constituents and calculated chemical compositions of examples

| Composition | V | X | Y | Z |
|---|---|---|---|---|
| Talc C | 14.35 | — | — | — |
| Talc D | — | 38.37 | 39.87 | 41.21 |
| Magnesium Hydroxide | 12.00 | — | — | — |
| Alumina A | — | 29.18 | 29.50 | 29.40 |
| Alumina C | 26.23 | — | — | — |
| Boehmite | — | 5.00 | 5.00 | 5.00 |
| Kaolin | 16.00 | — | — | — |
| Quartz | 31.42 | 27.45 | 25.63 | 24.38 |
| Bentonite A | 5.00 | — | — | — |
| Bentonite B | — | — | — | — |
| Lanthanum Oxide | 1.00 | 0.60 | 0.30 | 2.10 |
| Graphite A | — | 15.00 | 15.00 | 15.00 |
| Graphite B | 15.00 | — | — | — |
| Walnut Shell Flour A | — | 35.00 | 35.00 | 35.00 |
| Rice Starch | 25.00 | — | — | — |
| Methyl Cellulose | 6.0 | 6.0 | 6.0 | 6.0 |
| Sodium Stearate | — | 1.0 | 1.0 | 1.0 |
| Tall oil | 0.6 | — | — | — |
| Durasyn ® 162 | 4.6 | — | — | — |
| Calculated ceramic composition (wt %) | | | | |
| MgO | 12.84 | 12.38 | 12.91 | 13.11 |
| $Al_2O_3$ | 33.65 | 34.30 | 34.77 | 34.07 |
| $SiO_2$ | 51.06 | 51.87 | 51.15 | 49.83 |
| $Fe_2O_3$ | 0.664 | 0.497 | 0.514 | 0.518 |
| $TiO_2$ | 0.180 | 0.028 | 0.028 | 0.028 |
| $Na_2O$ | 0.197 | 0.161 | 0.161 | 0.158 |
| $K_2O$ | 0.049 | 0.014 | 0.014 | 0.013 |
| CaO | 0.221 | 0.128 | 0.130 | 0.130 |
| NiO | 0.073 | 0.000 | 0.000 | 0.000 |
| $P_2O_5$ | 0.043 | 0.021 | 0.021 | 0.020 |
| $La_2O_3$ | 1.012 | 0.613 | 0.308 | 2.117 |

TABLE 7

Parts by weight of raw material constituents and calculated chemical compositions of examples

| | Composition | | | | | |
|---|---|---|---|---|---|---|
| | AA | BB | CC | DD | EE | FF |
| Chlorite | 36.39 | — | — | — | — | — |
| Talc D | — | 23.47 | 18.97 | 18.97 | 18.97 | 18.97 |
| Magnesium Hydroxide | — | — | 10.00 | 10.00 | 10.00 | 10.00 |
| Spinel | — | 25.00 | — | — | — | — |
| Alumina A | 20.57 | 9.34 | 26.03 | 26.03 | 26.03 | 26.03 |
| Boehmite | 5.00 | — | — | — | — | — |
| Kaolin | — | 16.00 | 16.00 | 16.00 | 16.00 | 16.00 |
| Quartz | 38.04 | 26.12 | 29.00 | 29.00 | 29.00 | 29.00 |
| Calcium Carbonate | — | — | — | 0.27 | 0.71 | 1.16 |
| Lanthanum Oxide | 0.60 | 1.00 | 1.00 | 0.75 | 0.50 | 0.25 |
| Graphite A | 15.00 | 20.00 | 20.00 | 20.00 | 20.00 | 20.00 |
| Walnut Shell Flour A | 35.00 | 30.00 | 30.00 | 30.00 | 30.00 | 30.00 |
| Methyl Cellulose | 6.00 | 6.00 | 6.00 | 6.00 | 6.00 | 6.00 |
| Sodium Stearate | 1.00 | 1.00 | 1.00 | 1.00 | 1.00 | 1.00 |
| Calculated ceramic composition (wt %) | | | | | | |
| MgO | 12.65 | 13.40 | 13.51 | 13.52 | 13.52 | 13.52 |
| $Al_2O_3$ | 34.15 | 35.69 | 34.16 | 34.19 | 34.19 | 34.19 |
| $SiO_2$ | 52.06 | 48.83 | 50.32 | 50.37 | 50.37 | 50.37 |
| $Fe_2O_3$ | 0.174 | 0.431 | 0.379 | 0.380 | 0.380 | 0.380 |
| $TiO_2$ | 0.053 | 0.185 | 0.189 | 0.189 | 0.189 | 0.189 |
| $Na_2O$ | 0.159 | 0.206 | 0.169 | 0.169 | 0.169 | 0.169 |
| $K_2O$ | 0.021 | 0.019 | 0.022 | 0.022 | 0.022 | 0.022 |
| CaO | 0.072 | 0.185 | 0.180 | 0.340 | 0.600 | 0.866 |
| NiO | 0.000 | 0.000 | 0.000 | 0.000 | 0.000 | 0.000 |
| $P_2O_5$ | 0.019 | 0.026 | 0.026 | 0.026 | 0.026 | 0.026 |
| $La_2O_3$ | 0.634 | 1.024 | 1.053 | 0.791 | 0.527 | 0.264 |

TABLE 8

Parts by weight of raw material constituents and calculated chemical compositions of examples

| | Composition | | | | | | | | |
|---|---|---|---|---|---|---|---|---|---|
| | GG | HH | II | JJ | KK | LL | MM | NN | OO |
| Talc A | 23.47 | 23.47 | — | — | — | 23.47 | — | — | — |
| Talc B | — | — | — | 23.47 | — | — | — | — | — |
| Talc D | — | — | 23.47 | — | 23.47 | — | 23.47 | 42.38 | 42.38 |
| Spinel | 25.00 | 25.00 | 25.00 | 25.00 | 25.00 | 25.00 | 25.00 | — | — |
| Alumina A | 9.34 | 9.34 | 9.34 | — | 9.34 | 9.34 | 9.34 | 30.12 | 30.12 |
| Alumina B | — | — | — | 9.34 | — | — | — | — | — |
| Boehmite | — | — | — | — | — | — | — | 5.00 | 5.00 |
| Kaolin | 16.00 | 16.00 | 16.00 | 16.00 | 16.00 | 16.00 | 16.00 | — | — |
| Quartz | 26.12 | 26.12 | 26.12 | 26.12 | 26.12 | 26.12 | 26.12 | 23.50 | 23.50 |
| Bentonite B | — | 1.00 | 1.00 | 1.00 | 1.00 | — | 1.00 | 5.00 | — |
| Yttrium Oxide | — | — | — | — | — | — | — | — | 1.00 |
| Lanthanum Oxide | 1.00 | 1.00 | 1.00 | 1.00 | 1.00 | 1.00 | 1.00 | 0.00 | 0.00 |
| Graphite A | 30.00 | 30.00 | 30.00 | 20.00 | 20.00 | 20.00 | 20.00 | — | — |
| Walnut Shell Flour B | 30.00 | 30.00 | 30.00 | — | 20.00 | — | — | 40.00 | 40.00 |
| Walnut Shell Flour C | — | — | — | 20.00 | — | 40.00 | — | — | — |
| Walnut Shell Flour D | — | — | — | — | — | — | 40.00 | — | — |
| Methyl Cellulose | 6.00 | 6.00 | 6.00 | 6.00 | 6.00 | 6.00 | 6.00 | 6.00 | 6.00 |
| Sodium Stearate | 1.00 | 1.00 | 1.00 | 1.00 | 1.00 | 1.00 | 1.00 | 1.00 | 1.00 |
| Calculated ceramic composition (wt %) | | | | | | | | | |
| MgO | 13.12 | 13.02 | 13.29 | 13.04 | 13.30 | 13.13 | 13.30 | 13.17 | 13.52 |
| $Al_2O_3$ | 35.52 | 35.35 | 35.50 | 35.45 | 35.52 | 35.53 | 35.51 | 34.49 | 34.88 |
| $SiO_2$ | 48.83 | 49.05 | 49.02 | 48.88 | 49.06 | 48.85 | 49.04 | 51.12 | 49.78 |
| $Fe_2O_3$ | 0.797 | 0.827 | 0.515 | 0.833 | 0.465 | 0.746 | 0.465 | 0.635 | 0.455 |
| $TiO_2$ | 0.174 | 0.174 | 0.186 | 0.173 | 0.185 | 0.173 | 0.184 | 0.033 | 0.026 |
| $Na_2O$ | 0.199 | 0.218 | 0.225 | 0.218 | 0.225 | 0.199 | 0.225 | 0.264 | 0.159 |
| $K_2O$ | 0.019 | 0.023 | 0.023 | 0.023 | 0.023 | 0.020 | 0.023 | 0.034 | 0.013 |
| CaO | 0.178 | 0.189 | 0.199 | 0.200 | 0.181 | 0.191 | 0.212 | 0.207 | 0.136 |
| NiO | 0.116 | 0.115 | 0.000 | 0.108 | 0.000 | 0.116 | 0.000 | 0.000 | 0.000 |
| $P_2O_5$ | 0.023 | 0.024 | 0.026 | 0.021 | 0.023 | 0.026 | 0.029 | 0.025 | 0.022 |
| $Y_2O_3$ | 0.000 | 0.000 | 0.000 | 0.000 | 0.000 | 0.000 | 0.000 | 0.000 | 1.011 |
| $La_2O_3$ | 1.023 | 1.014 | 1.014 | 1.017 | 1.015 | 1.024 | 1.014 | 0.000 | 0.000 |

The calculated metal oxide composition of each ceramic shown in Tables 3 to 8 is based upon the metal oxides contributed by the weight fractions of each inorganic raw material in the batch, re-normalized to sum to 100%.

Table 9 lists the heat treatment cycle for Examples 33 to 36 below.

TABLE 9

Heat treatment cycle for Examples 33 to 36.

| Beginning Temperature (° C.) | Ending Temperature (° C.) | Heating rate (° C./h) | Duration between Temperatures (hours) | Cumulative Time (hours) |
|---|---|---|---|---|
| 25 | 800 | 100 | 7.750 | 7.750 |
| 800 | 900 | 17 | 5.882 | 13.632 |
| 900 | 1000 | 60 | 1.667 | 15.299 |
| 1000 | 1100 | 200 | 0.500 | 15.799 |
| 1100 | 1100 | 0 | 0.150 | 15.949 |
| 1100 | 1000 | −200 | 0.500 | 16.449 |
| 1000 | 900 | −60 | 1.667 | 18.116 |
| 900 | 800 | −17 | 5.882 | 23.998 |

TABLE 9-continued

Heat treatment cycle for Examples 33 to 36.

| Beginning Temperature (° C.) | Ending Temperature (° C.) | Heating rate (° C./h) | Duration between Temperatures (hours) | Cumulative Time (hours) |
|---|---|---|---|---|
| 800 | 900 | 17 | 5.882 | 29.880 |
| 900 | 1000 | 60 | 1.667 | 31.547 |
| 1000 | 1100 | 200 | 0.500 | 32.047 |
| 1100 | 1100 | 0 | 0.150 | 32.197 |
| 1100 | 1000 | −200 | 0.500 | 32.697 |
| 1000 | 900 | −60 | 1.667 | 34.364 |
| 900 | 800 | −17 | 5.882 | 40.246 |
| 800 | 25 | −100 | 7.750 | 47.996 |

Tables 10 to 21 give the various physical properties for the sintered examples and, in some instances, after subsequent exposure at high temperature.

TABLE 10

Firing schedules and physical properties of Examples 1 to 4

| | \multicolumn{8}{c}{Example No.} | | | | | | | |
|---|---|---|---|---|---|---|---|---|
| | 1A | 1B | 2A | 2B | 3A | 3B | 4A | 4B |
| | \multicolumn{8}{c}{Composition} | | | | | | | |
| | A | A | B | B | C | C | D | D |
| Condition | As-fired | 950° C./82 h | As-fired | 950° C./82 h | As-fired | 950° C./82 h | As-fired | 950° C./82 h |
| 800-900 Heating Rate | 75 | 50 | 75 | 50 | 75 | 50 | 75 | 50 |
| 1150-1200 Heating Rate | 20 | 50 | 20 | 50 | 20 | 50 | 20 | 50 |
| 1200-1300 Heating Rate | 10 | 50 | 10 | 50 | 10 | 50 | 10 | 50 |
| 1300-1350 Heating Rate | 10 | 50 | 10 | 50 | 10 | 50 | 10 | 50 |
| 1350-Tmax Heating Rate | 10 | 50 | 10 | 50 | 10 | 50 | 10 | 50 |
| Tmax (° C.) | 1380 | 950 | 1380 | 950 | 1380 | 950 | 1380 | 950 |
| Hold (h) | 20 | 82 | 20 | 82 | 20 | 82 | 20 | 82 |
| Nominal Cell Geometry | 300/13 | 300/13 | 300/13 | 300/13 | 300/13 | 300/13 | 300/13 | 300/13 |
| Density of Cellular Bar (g/cm$^3$) | 0.371 | 0.381 | 0.400 | 0.396 | 0.389 | 0.391 | 0.406 | 0.406 |
| CFA | 0.394 | 0.404 | 0.406 | 0.402 | 0.417 | 0.419 | 0.408 | 0.408 |
| % Porosity | 62.5 | | 60.8 | | 62.9 | | 60.4 | |
| $d_1$ | 2.0 | | 3.6 | | 3.1 | | 3.6 | |
| $d_2$ | 3.0 | | 4.3 | | 3.9 | | 4.3 | |
| $d_5$ | 4.5 | | 5.6 | | 5.3 | | 5.6 | |
| $d_{10}$ | 6.0 | | 7.0 | | 6.6 | | 7.0 | |
| $d_{25}$ | 8.5 | | 9.4 | | 9.1 | | 9.3 | |
| $d_{50}$ | 10.7 | | 11.4 | | 11.2 | | 11.4 | |
| $d_{75}$ | 12.3 | | 12.8 | | 12.8 | | 13.1 | |
| $d_{90}$ | 16.8 | | 16.1 | | 16.7 | | 17.3 | |
| $d_{95}$ | 37.2 | | 33.8 | | 35.5 | | 35.3 | |
| $d_{98}$ | 147.1 | | 139.7 | | 150.5 | | 141.1 | |
| $d_{99}$ | 203.5 | | 202.6 | | 210.1 | | 204.7 | |
| $d_f = (d_{50} - d_{10})/d_{50}$ | 0.44 | | 0.39 | | 0.41 | | 0.38 | |
| $d_b = (d_{90} - d_{10})/d_{50}$ | 1.02 | | 0.80 | | 0.89 | | 0.90 | |
| $PCF_b = \% Porosity/d_b$ | 61 | | 76 | | 70 | | 67 | |
| $PCF_f = \% Porosity/d_f$ | 141 | | 157 | | 153 | | 157 | |
| $CTE_{25-800° C.}$ ($10^{-7}$/° C.) | 14.5 | 16.1 | 13.4 | 13.2 | 13.5 | 15.0 | 13.9 | 13.4 |
| $CTE_{200-1000° C.}$ ($10^{-7}$/° C.) | 18.6 | 20.8 | 17.6 | 17.6 | 17.4 | 19.6 | 18.1 | 17.4 |
| $CTE500-900° C.$ ($10^{-7}$/° C.) | 21.5 | 23.5 | 20.6 | 20.0 | 20.2 | 22.0 | 20.9 | 20.1 |
| Transverse I-ratio | 0.74 | | 0.73 | | 0.79 | | 0.77 | |
| Axial I-ratio | 0.52 | | 0.55 | | 0.51 | | 0.54 | |
| % Mullite | 0 | | 0 | | 0 | | 0 | |
| % Spinel + Sapphirine | 1.7 | | 2.5 | | 2.0 | | 1.5 | |
| % Alumina | 0 | | 0 | | 0 | | 0 | |
| MOR (psi) | 682 | 572 | 744 | 662 | 636 | 562 | 728 | 840 |
| MOR/CFA (psi) | 1732 | 1415 | 1830 | 1646 | 1524 | 1340 | 1785 | 2058 |
| % MOR Retention | — | 84% | — | 89% | — | 88% | — | 115% |
| $E_{25° C.}$ (psi) | 3.69E+05 | 3.87E+05 | 4.30E+05 | 4.20E+05 | 3.88E+05 | 4.00E+05 | 4.72E+05 | 4.62E+05 |
| $E_{800° C.}$ (psi) | 3.49E+05 | 3.70E+05 | 4.07E+05 | 4.00E+05 | 3.67E+05 | 3.79E+05 | 4.45E+05 | 4.36E+05 |
| $E_{900° C.}$ (psi) | 3.33E+05 | 3.64E+05 | 3.92E+05 | 3.85E+05 | 3.48E+05 | 3.66E+05 | 4.05E+05 | 4.09E+05 |
| $E_{1000° C.}$ (psi) | 3.02E+05 | 3.47E+05 | 3.45E+05 | 3.55E+05 | 3.19E+05 | 3.41E+05 | 3.64E+05 | 3.65E+05 |
| $E_{800° C.}/E_{25° C.}$ | 0.946 | 0.956 | 0.947 | 0.952 | 0.946 | 0.948 | 0.943 | 0.944 |
| $E_{900° C.}/E_{25° C.}$ | 0.902 | 0.940 | 0.912 | 0.917 | 0.897 | 0.915 | 0.858 | 0.885 |
| $E_{1000° C.}/E_{25° C.}$ | 0.818 | 0.897 | 0.802 | 0.845 | 0.822 | 0.853 | 0.771 | 0.790 |
| $Nb^3$ | 0.018 | 0.028 | 0.014 | 0.021 | 0.016 | 0.017 | 0.014 | 0.014 |
| $MOR/E \times 10^2$ | 0.185 | 0.148 | 0.173 | 0.158 | 0.164 | 0.140 | 0.154 | 0.182 |
| $TSL_{200}$ (° C.) | 1192 | 911 | 1181 | 1095 | 1140 | 919 | 1054 | 1248 |
| $TSL_{500}$ (° C.) | 1362 | 1131 | 1340 | 1288 | 1311 | 1138 | 1238 | 1407 |

TABLE 11

Firing schedules and physical properties of Examples 5 to 7

| | \multicolumn{6}{c}{Example No.} | | | | | |
|---|---|---|---|---|---|---|
| | 5A | 5B | 6A | 6B | 7A | 7B |
| | \multicolumn{6}{c}{Composition} | | | | | |
| | E | E | F | F | G | G |
| Condition | As-fired | 950° C./82 h | As-fired | 950° C./82 h | As-fired | 950° C./82 h |
| 800-900 Heating Rate | 75 | 50 | 75 | 50 | 75 | 50 |
| 1150-1200 Heating Rate | 20 | 50 | 20 | 50 | 20 | 50 |
| 1200-1300 Heating Rate | 10 | 50 | 10 | 50 | 10 | 50 |
| 1300-1350 Heating Rate | 10 | 50 | 10 | 50 | 10 | 50 |
| 1350-Tmax Heating Rate | 10 | 50 | 10 | 50 | 10 | 50 |

TABLE 11-continued

Firing schedules and physical properties of Examples 5 to 7

| | Example No. | | | | | |
|---|---|---|---|---|---|---|
| | 5A | 5B | 6A | 6B | 7A | 7B |
| | Composition | | | | | |
| | E | E | F | F | G | G |
| Tmax (° C.) | 1380 | 950 | 1380 | 950 | 1380 | 950 |
| Hold (h) | 20 | 82 | 20 | 82 | 20 | 82 |
| Nominal Cell Geometry | 300/13 | 300/13 | 300/13 | 300/13 | 300/13 | 300/13 |
| Density of Cellular Bar (g/cm$^3$) | 0.422 | 0.423 | 0.386 | 0.387 | 0.403 | 0.423 |
| CFA | 0.423 | 0.424 | 0.418 | 0.419 | 0.411 | 0.431 |
| % Porosity | 60.3 | | 63.2 | | 60.9 | |
| $d_1$ | 2.7 | | 3.0 | | 4.0 | |
| $d_2$ | 3.7 | | 3.8 | | 4.9 | |
| $d_5$ | 5.0 | | 5.2 | | 6.2 | |
| $d_{10}$ | 6.4 | | 6.6 | | 7.4 | |
| $d_{25}$ | 8.8 | | 9.1 | | 9.6 | |
| $d_{50}$ | 11.0 | | 11.3 | | 11.6 | |
| $d_{75}$ | 12.6 | | 13.3 | | 13.0 | |
| $d_{90}$ | 17.1 | | 18.0 | | 16.7 | |
| $d_{95}$ | 38.3 | | 36.1 | | 28.0 | |
| $d_{98}$ | 148.7 | | 135.6 | | 113.6 | |
| $d_{99}$ | 209.6 | | 203.6 | | 176.9 | |
| $d_f = (d_{50} - d_{10})/d_{50}$ | 0.42 | | 0.42 | | 0.36 | |
| $d_b = (d_{90} - d_{10})/d_{50}$ | 0.98 | | 1.00 | | 0.80 | |
| $PCF_b$ = % Porosity/$d_b$ | 62 | | 63 | | 76 | |
| $PCF_f$ = % Porosity/$d_f$ | 144 | | 151 | | 169 | |
| $CTE_{25-800° C.}$ ($10^{-7}$/° C.) | 13.7 | 14.1 | 14.6 | 12.1 | 14.0 | 10.5 |
| $CTE_{200-1000° C.}$ ($10^{-7}$/° C.) | 17.8 | 18.9 | 18.6 | 16.6 | 18.1 | 15.2 |
| $CTE_{500-900° C.}$ ($10^{-7}$/° C.) | 20.6 | 21.5 | 21.7 | 19.2 | 21.1 | 17.7 |
| Transverse I-ratio | 0.77 | | 0.75 | | 0.78 | |
| Axial I-ratio | 0.56 | | 0.53 | | 0.50 | |
| % Mullite | 0 | | 0 | | 0 | |
| % Spinel + Sapphirine | 1.9 | | 2.0 | | 1.6 | |
| % Alumina | 0 | | 0 | | 0 | |
| MOR (psi) | 629 | 569 | 609 | 411 | 798 | 486 |
| MOR/CFA (psi) | 1485 | 1341 | 1458 | 981 | 1943 | 1127 |
| % MOR Retention | | 91% | | 67% | | 61% |
| $E_{25° C.}$ (psi) | 5.08E+05 | 4.74E+05 | 3.96E+05 | 3.64E+05 | 4.74E+05 | 4.31E+05 |
| $E_{800° C.}$ (psi) | 4.76E+05 | 4.72E+05 | 3.79E+05 | 3.60E+05 | 4.45E+05 | 4.47E+05 |
| $E_{900° C.}$ (psi) | 4.37E+05 | 4.82E+05 | 3.53E+05 | 3.58E+05 | 4.03E+05 | 4.64E+05 |
| $E_{1000° C.}$ (psi) | 4.22E+05 | 4.82E+05 | 3.35E+05 | 3.55E+05 | 3.83E+05 | 4.75E+05 |
| $E_{800° C.}/E_{25° C.}$ | 0.937 | 0.996 | 0.957 | 0.989 | 0.939 | 1.037 |
| $E_{900° C.}/E_{25° C.}$ | 0.860 | 1.017 | 0.891 | 0.984 | 0.850 | 1.077 |
| $E_{1000° C.}/E_{25° C.}$ | 0.831 | 1.017 | 0.846 | 0.975 | 0.808 | 1.102 |
| $Nb^3$ | 0.009 | 0.073 | 0.024 | 0.047 | 0.011 | 0.126 |
| MOR/E × $10^2$ | 0.124 | 0.120 | 0.154 | 0.113 | 0.168 | 0.113 |
| $TSL_{200}$ (° C.) | 897 | 834 | 1028 | 880 | 1131 | 944 |
| $TSL_{500}$ (° C.) | 1100 | 1058 | 1209 | 1087 | 1300 | 1139 |

TABLE 12

Firing schedules and physical properties of Examples 8 to 10

| | Example No. | | | | | | | |
|---|---|---|---|---|---|---|---|---|
| | 8A | 8B | 9A | 9B | 9C | 10A | 10B | 10C |
| | Composition | | | | | | | |
| | H | H | I | I | I | J | J | J |
| Condition | As-fired | 950° C./82 h | As-fired | 950° C./82 h | 1100° C./82 h | As-fired | 950° C./82 h | 1100° C./82 h |
| 800-900 Heating Rate | 75 | 50 | 34 | 50 | 50 | 34 | 50 | 50 |
| 1150-1200 Heating Rate | 20 | 50 | 75 | 50 | 50 | 75 | 50 | 50 |
| 1200-1300 Heating Rate | 10 | 50 | 75 | 50 | 50 | 75 | 50 | 50 |
| 1300-1350 Heating Rate | 10 | 50 | 6 | 50 | 50 | 6 | 50 | 50 |
| 1350-Tmax Heating Rate | 10 | 50 | 6 | 50 | 50 | 6 | 50 | 50 |
| Tmax (° C.) | 1380 | 950 | 1415 | 950 | 1100 | 1415 | 950 | 1100 |
| Hold (h) | 20 | 82 | 30 | 82 | 82 | 30 | 82 | 82 |
| Nominal Cell Geometry | 300/13 | 300/13 | 275/14 | 275/14 | 275/14 | 275/14 | 275/14 | 275/14 |
| Density of Cellular Bar (g/cm$^3$) | 0.382 | 0.384 | 0.503 | 0.514 | 0.506 | 0.522 | 0.521 | 0.503 |
| CFA | 0.396 | 0.398 | 0.452 | 0.461 | 0.454 | 0.439 | 0.438 | 0.423 |
| % Porosity | 61.6 | | 55.6 | | | 52.7 | | |

TABLE 12-continued

Firing schedules and physical properties of Examples 8 to 10

| | 8A | 8B | 9A | 9B | 9C | 10A | 10B | 10C |
|---|---|---|---|---|---|---|---|---|
| | | | | | Composition | | | |
| | H | H | I | I | I | J | J | J |
| $d_1$ | 3.6 | | 7.5 | | | 9.9 | | |
| $d_2$ | 4.6 | | 8.2 | | | 10.8 | | |
| $d_5$ | 6.1 | | 9.3 | | | 12.3 | | |
| $d_{10}$ | 7.4 | | 10.5 | | | 13.5 | | |
| $d_{25}$ | 9.7 | | 12.2 | | | 15.4 | | |
| $d_{50}$ | 11.8 | | 13.9 | | | 17.0 | | |
| $d_{75}$ | 13.2 | | 15.9 | | | 18.8 | | |
| $d_{90}$ | 16.8 | | 19.4 | | | 24.8 | | |
| $d_{95}$ | 29.3 | | 25.8 | | | 41.9 | | |
| $d_{98}$ | 140.6 | | 57.2 | | | 107.9 | | |
| $d_{99}$ | 206.6 | | 97.0 | | | 169.9 | | |
| $d_f = (d_{50} - d_{10})/d_{50}$ | 0.37 | | 0.25 | | | 0.20 | | |
| $d_b = (d_{90} - d_{10})/d_{50}$ | 0.80 | | 0.64 | | | 0.66 | | |
| $PCF_b = \% \text{ Porosity}/d_b$ | 77 | | 87 | | | 79 | | |
| $PCF_f = \% \text{ Porosity}/d_f$ | 165 | | 224 | | | 258 | | |
| $CTE_{25\text{-}800°C.} (10^{-7}/°C.)$ | 12.7 | 10.9 | 14.3 | 14.5 | 13.7 | 14.7 | 13.7 | 14.0 |
| $CTE_{200\text{-}1000°C.} (10^{-7}/°C.)$ | 16.1 | 15.6 | 18.9 | 18.8 | 18.4 | 19.1 | 18.0 | 18.3 |
| $CTE_{500\text{-}900°C.} (10^{-7}/°C.)$ | 19.1 | 17.9 | 21.7 | 21.4 | 21.0 | 21.9 | 20.7 | 20.9 |
| Transverse I-ratio | 0.76 | | 0.76 | | | 0.78 | | |
| Axial I-ratio | 0.49 | | — | | | — | | |
| % Mullite | 0 | | 0.0 | | | 0.6 | | |
| % Spinel + Sapphirine | 1.6 | | 1.3 | | | 0.7 | | |
| % Alumina | 0 | | 0.0 | | | 0.0 | | |
| MOR (psi) | 730 | 397 | 1555.9 | 1381.6 | 1248.8 | 1927.2 | 1547 | 1425.9 |
| MOR/CFA (psi) | 1844 | 997 | 3446 | 2994 | 2749 | 4387 | 3528 | 3368 |
| % MOR Retention | | 54% | — | 89% | 80% | — | 80% | 74% |
| $E_{25°C.}$ (psi) | 3.87E+05 | 3.33E+05 | 7.47E+05 | 7.69E+05 | 7.35E+05 | 9.28E+05 | 9.35E+05 | 8.36E+05 |
| $E_{800°C.}$ (psi) | 3.62E+05 | 3.38E+05 | 7.07E+05 | 7.32E+05 | 7.00E+05 | 8.74E+05 | 8.90E+05 | 7.96E+05 |
| $E_{900°C.}$ (psi) | 3.23E+05 | 3.47E+05 | 6.84E+05 | 7.15E+05 | 6.87E+05 | 8.39E+05 | 8.62E+05 | 7.87E+05 |
| $E_{1000°C.}$ (psi) | 3.26E+05 | 3.54E+05 | 6.13E+05 | 6.56E+05 | 6.27E+05 | 7.40E+05 | 7.97E+05 | 7.02E+05 |
| $E_{800°C.}/E_{25°C.}$ | 0.935 | 1.015 | 0.946 | 0.952 | 0.952 | 0.942 | 0.952 | 0.952 |
| $E_{900°C.}/E_{25°C.}$ | 0.835 | 1.042 | 0.916 | 0.930 | 0.935 | 0.904 | 0.922 | 0.941 |
| $E_{1000°C.}/E_{25°C.}$ | 0.842 | 1.063 | 0.821 | 0.853 | 0.853 | 0.797 | 0.852 | 0.840 |
| $Nb^3$ | 0.010 | 0.101 | 0.024 | 0.026 | 0.031 | 0.022 | 0.025 | 0.031 |
| $MOR/E \times 10^2$ | 0.189 | 0.119 | 0.208 | 0.180 | 0.170 | 0.208 | 0.165 | 0.171 |
| $TSL_{200}$ (°C.) | 1372 | 963 | 1300 | 1158 | 1123 | 1289 | 1118 | 1130 |
| $TSL_{500}$ (°C.) | 1488 | 1165 | 1459 | 1341 | 1309 | 1449 | 1300 | 1315 |

TABLE 13

Firing schedules and physical properties of Examples 11 and 13

| | 11A | 11B | 11C | 13A | 13B | 13C |
|---|---|---|---|---|---|---|
| | | | Composition | | | |
| | K | K | K | M | M | M |
| Condition | As-fired | 950° C./82 h | 1100° C./82 h | As-fired | 950° C./82 h | 1100° C./82 h |
| 800-900 Heating Rate | 34 | 50 | 50 | 34 | 50 | 50 |
| 1150-1200 Heating Rate | 75 | 50 | 50 | 75 | 50 | 50 |
| 1200-1300 Heating Rate | 75 | 50 | 50 | 75 | 50 | 50 |
| 1300-1350 Heating Rate | 6 | 50 | 50 | 6 | 50 | 50 |
| 1350-Tmax Heating Rate | 6 | 50 | 50 | 6 | 50 | 50 |
| Tmax (° C.) | 1415 | 950 | 1100 | 1415 | 950 | 1100 |
| Hold (h) | 30 | 82 | 82 | 30 | 82 | 82 |
| Nominal Cell Geometry | 275/14 | 275/14 | 275/14 | 275/14 | 275/14 | 275/14 |
| Density of Cellular Bar (g/cm³) | 0.491 | 0.486 | 0.496 | 0.535 | 0.514 | 0.520 |
| CFA | 0.457 | 0.452 | 0.461 | 0.432 | 0.415 | 0.420 |
| % Porosity | 57.2 | | | 50.7 | | |
| $d_1$ | 8.6 | | | 9.8 | | |
| $d_2$ | 9.6 | | | 10.7 | | |
| $d_5$ | 10.5 | | | 12.3 | | |
| $d_{10}$ | 11.4 | | | 13.5 | | |
| $d_{25}$ | 14.2 | | | 15.7 | | |

TABLE 13-continued

Firing schedules and physical properties of Examples 11 and 13

| | Example No. | | | | | |
|---|---|---|---|---|---|---|
| | 11A | 11B | 11C | 13A | 13B | 13C |
| | | | | Composition | | |
| | K | K | K | M | M | M |
| $d_{50}$ | 16.5 | | | 17.5 | | |
| $d_{75}$ | 19.1 | | | 19.9 | | |
| $d_{90}$ | 23.3 | | | 27.0 | | |
| $d_{95}$ | 32.0 | | | 50.1 | | |
| $d_{98}$ | 71.6 | | | 125.1 | | |
| $d_{99}$ | 124.6 | | | 185.5 | | |
| $d_f = (d_{50} - d_{10})/d_{50}$ | 0.30 | | | 0.23 | | |
| $d_b = (d_{90} - d_{10})/d_{50}$ | 0.72 | | | 0.77 | | |
| $PCF_b = \%$ Porosity/$d_b$ | 79 | | | 66 | | |
| $PCF_f = \%$ Porosity/$d_f$ | 188 | | | 224 | | |
| $CTE_{25\text{-}800°\,C.}$ ($10^{-7}/°$ C.) | 16.4 | 14.6 | 15.5 | 15.3 | 11.6 | 14.8 |
| $CTE_{200\text{-}1000°\,C.}$ ($10^{-7}/°$ C.) | 20.6 | 18.6 | 20.0 | 19.4 | 15.7 | 19.1 |
| $CTE_{500\text{-}900°\,C.}$ ($10^{-7}/°$ C.) | 23.2 | 21.3 | 22.6 | 22.4 | 18.3 | 22.1 |
| Transverse I-ratio | 0.78 | | | 0.80 | | |
| Axial I-ratio | — | | | — | | |
| % Mullite | 1.0 | | | — | | |
| % Spinel + Sapphirine | 1.6 | | | — | | |
| % Alumina | 0.0 | | | — | | |
| MOR (psi) | 1667.7 | 1115.3 | 1412.9 | 2010.4 | 698.7 | 1343.2 |
| MOR/CFA (psi) | 3652 | 2467 | 3063 | 4653 | 1683 | 3199 |
| % MOR Retention | — | 67% | 85% | — | 35% | 67% |
| $E_{25°\,C.}$ (psi) | 7.23E+05 | 6.58E+05 | 7.26E+05 | 1.03E+06 | 7.50E+05 | 9.38E+05 |
| $E_{800°\,C.}$ (psi) | 6.82E+05 | 6.32E+05 | 6.91E+05 | 9.81E+05 | 7.97E+05 | 9.17E+05 |
| $E_{900°\,C.}$ (psi) | 6.44E+05 | 6.17E+05 | 6.72E+05 | 9.33E+05 | 8.38E+05 | 9.22E+05 |
| $E_{1000°\,C.}$ (psi) | 5.73E+05 | 5.65E+05 | 6.07E+05 | 8.09E+05 | 8.93E+05 | 8.43E+05 |
| $E_{800°\,C.}/E_{25°\,C.}$ | 0.943 | 0.960 | 0.952 | 0.952 | 1.063 | 0.978 |
| $E_{900°\,C.}/E_{25°\,C.}$ | 0.891 | 0.938 | 0.926 | 0.906 | 1.117 | 0.983 |
| $E_{1000°\,C.}/E_{25°\,C.}$ | 0.793 | 0.859 | 0.836 | 0.785 | 1.191 | 0.899 |
| $Nb^3$ | 0.023 | 0.042 | 0.028 | 0.025 | 0.219 | 0.080 |
| MOR/E × $10^2$ | 0.231 | 0.169 | 0.195 | 0.195 | 0.093 | 0.143 |
| $TSL_{200}$ (° C.) | 1320 | 1110 | 1173 | 1205 | 792 | 949 |
| $TSL_{500}$ (° C.) | 1494 | 1296 | 1360 | 1373 | 1008 | 1149 |

TABLE 14

Firing schedules and physical properties of Examples 14 to 16

| | Example No. | | | | | | |
|---|---|---|---|---|---|---|---|
| | 14A | 14B | 14C | 15A | 15B | 16A | 16B |
| | | | | Composition | | | |
| | N | N | N | O | O | P | P |
| Condition | As-fired | 950° C./82 h | 1100° C./82 h | As-Fired | 950° C./82 h | As-Fired | 950° C./82 h |
| 800-900 Heating Rate | 34 | 50 | 50 | 20 | 50 | 20 | 50 |
| 1150-1200 Heating Rate | 75 | 50 | 50 | 20 | 50 | 20 | 50 |
| 1200-1300 Heating Rate | 75 | 50 | 50 | 10 | 50 | 10 | 50 |
| 1300-1350 Heating Rate | 6 | 50 | 50 | 10 | 50 | 10 | 50 |
| 1350-Tmax Heating Rate | 6 | 50 | 50 | 10 | 50 | 10 | 50 |
| Tmax (° C.) | 1415 | 950 | 1100 | 1380 | 950 | 1380 | 950 |
| Hold (h) | 30 | 82 | 82 | 20 | 82 | 20 | 82 |
| Nominal Cell Geometry | 275/14 | 275/14 | 275/14 | 200/12 | 200/12 | 200/12 | 200/12 |
| Density of Cellular Bar (g/cm$^3$) | 0.520 | 0.512 | 0.497 | 0.297 | 0.294 | 0.295 | 0.284 |
| CFA | 0.462 | 0.455 | 0.442 | 0.291 | 0.288 | 0.277 | 0.267 |
| % Porosity | 55.2 | | | 59.3 | | 57.6 | |
| $d_1$ | 9.8 | | | 3.4 | | 3.2 | |
| $d_2$ | 11.0 | | | 4.1 | | 4.0 | |
| $d_5$ | 12.6 | | | 5.1 | | 4.9 | |
| $d_{10}$ | 13.9 | | | 6.2 | | 5.6 | |
| $d_{25}$ | 16.0 | | | 7.9 | | 6.9 | |
| $d_{50}$ | 18.2 | | | 9.7 | | 8.2 | |
| $d_{75}$ | 21.3 | | | 11.4 | | 9.4 | |
| $d_{90}$ | 28.6 | | | 18.0 | | 13.0 | |
| $d_{95}$ | 49.9 | | | 49.4 | | 38.0 | |
| $d_{98}$ | 115.9 | | | 145.8 | | 132.6 | |
| $d_{99}$ | 169.4 | | | 1.22 | | 194.0 | |
| $d_f = (d_{50} - d_{10})/d_{50}$ | 0.24 | | | 0.36 | | 0.31 | |

TABLE 14-continued

Firing schedules and physical properties of Examples 14 to 16

| | 14A | 14B | 14C | 15A | 15B | 16A | 16B |
|---|---|---|---|---|---|---|---|
| Example No. | | | | | | | |
| Composition | N | N | N | O | O | P | P |
| $d_b = (d_{90} - d_{10})/d_{50}$ | 0.80 | | | 1.22 | | 0.90 | |
| $PCF_b = \%\ Porosity/d_b$ | 69 | | | 48 | | 64 | |
| $PCF_f = \%\ Porosity/d_f$ | 233 | | | 165 | | 184 | |
| $CTE_{25-800°\ C.}\ (10^{-7}/°\ C.)$ | 16.0 | 9.3 | 14.5 | 17.3 | 17.4 | 17.1 | 17.0 |
| $CTE_{200-1000°\ C.}\ (10^{-7}/°\ C.)$ | 20.0 | 13.9 | 19.0 | 21.7 | 21.4 | 21.8 | 21.4 |
| $CTE_{500-900°\ C.}\ (10^{-7}/°\ C.)$ | 22.6 | 16.6 | 21.6 | 24.2 | 24.0 | 24.4 | 23.9 |
| Transverse I-ratio | 0.78 | | | 0.64 | | 0.65 | |
| Axial I-ratio | — | | | 0.64 | | 0.64 | |
| % Mullite | 0.0 | | | 0 | | 0 | |
| % Spinel + Sapphirine | 1.2 | | | 1.8 | | 2.0 | |
| % Alumina | 0.0 | | | 0 | | 0 | |
| MOR (psi) | 1967.7 | 540.8 | 1380.6 | 520 | 497 | 486 | 566 |
| MOR/CFA (psi) | 4256 | 1188 | 3124 | 1790 | 1729 | 1756 | 2124 |
| % MOR Retention | | 27% | 70% | — | 96% | — | 116% |
| $E_{25°\ C.}$ (psi) | 9.02E+05 | 5.96E+05 | 7.71E+05 | 2.48E+05 | 2.57E+05 | 2.67E+05 | 2.53E+05 |
| $E_{800°\ C.}$ (psi) | 8.50E+05 | 6.57E+05 | 7.48E+05 | 2.35E+05 | 2.43E+05 | 2.54E+05 | 2.38E+05 |
| $E_{900°\ C.}$ (psi) | 7.84E+05 | 6.99E+05 | 7.32E+05 | 2.30E+05 | 2.36E+05 | 2.46E+05 | 2.30E+05 |
| $E_{1000°\ C.}$ (psi) | 7.15E+05 | 7.77E+05 | 6.67E+05 | 2.07E+05 | 2.17E+05 | 2.25E+05 | 2.14E+05 |
| $E_{800°\ C.}/E_{25°\ C.}$ | 0.942 | 1.102 | 0.970 | 0.948 | 0.946 | 0.951 | 0.941 |
| $E_{900°\ C.}/E_{25°\ C.}$ | 0.869 | 1.173 | 0.949 | 0.927 | 0.918 | 0.921 | 0.909 |
| $E_{1000°\ C.}/E_{25°\ C.}$ | 0.793 | 1.304 | 0.865 | 0.835 | 0.844 | 0.843 | 0.846 |
| $Nb^3$ | 0.027 | 0.303 | 0.058 | 0.013 | 0.009 | 0.014 | 0.003 |
| $MOR/E \times 10^2$ | 0.218 | 0.091 | 0.179 | 0.210 | 0.194 | 0.182 | 0.224 |
| $TSL_{200}$ (° C.) | 1291 | 853 | 1144 | 1167 | 1104 | 1037 | 1247 |
| $TSL_{500}$ (° C.) | 1467 | 1047 | 1329 | 1367 | 1306 | 1246 | 1436 |

TABLE 15

Firing schedules and physical properties of Examples 17 to 19

| | 17A | 17B | 17C | 18A | 18B | 19A | 19B |
|---|---|---|---|---|---|---|---|
| Example No. | | | | | | | |
| Composition | Q | Q | Q | R | R | S | S |
| Condition | As-fired | 950° C./82 h | 1100° C./82 h | As-fired | 950° C./82 h | As-fired | 950° C./82 h |
| 800-900 Heating Rate | 63 | 50 | 50 | 63 | 50 | 63 | 50 |
| 1150-1200 Heating Rate | 77 | 50 | 50 | 77 | 50 | 77 | 50 |
| 1200-1300 Heating Rate | 77 | 50 | 50 | 77 | 50 | 77 | 50 |
| 1300-1350 Heating Rate | 6 | 50 | 50 | 6 | 50 | 6 | 50 |
| 1350-Tmax Heating Rate | 6 | 50 | 50 | 6 | 50 | 6 | 50 |
| Tmax (° C.) | 1380 | 950 | 1100 | 1410 | 950 | 1410 | 950 |
| Hold (h) | 30 | 82 | 82 | 12 | 82 | 12 | 82 |
| Nominal Cell Geometry | 275/8 | 275/8 | 275/8 | 275/8 | 275/8 | 275/8 | 275/8 |
| Density of Cellular Bar (g/cm³) | 0.288 | 0.294 | 0.290 | 0.309 | 0.310 | 0.297 | 0.298 |
| CFA | 0.318 | 0.324 | 0.320 | 0.304 | 0.305 | 0.301 | 0.302 |
| % Porosity | 63.9 | | | 59.5 | | 60.7 | |
| $d_1$ | 7.2 | | | 5.9 | | 8.4 | |
| $d_2$ | 7.9 | | | 6.6 | | 9.3 | |
| $d_5$ | 9.2 | | | 7.9 | | 10.7 | |
| $d_{10}$ | 10.5 | | | 9.1 | | 12.0 | |
| $d_{25}$ | 12.7 | | | 11.2 | | 14.2 | |
| $d_{50}$ | 14.6 | | | 13.0 | | 16.1 | |
| $d_{75}$ | 16.9 | | | 15.1 | | 18.4 | |
| $d_{90}$ | 22.4 | | | 20.3 | | 25.7 | |
| $d_{95}$ | 40.0 | | | 35.6 | | 44.8 | |
| $d_{98}$ | 114.5 | | | 99.0 | | 111.1 | |
| $d_{99}$ | 176.5 | | | 159.8 | | 171.4 | |
| $d_f = (d_{50} - d_{10})/d_{50}$ | 0.28 | | | 0.30 | | 0.25 | |
| $d_b = (d_{90} - d_{10})/d_{50}$ | 0.81 | | | 0.86 | | 0.85 | |
| $PCF_b = \%\ Porosity/d_b$ | 78 | | | 69 | | 72 | |
| $PCF_f = \%\ Porosity/d_f$ | 227 | | | 199 | | 238 | |
| $CTE_{25-800°\ C.}\ (10^{-7}/°\ C.)$ | 17.8 | 18.8 | 21.5 | 16.7 | 16.6 | 18.1 | 16.2 |
| $CTE_{200-1000°\ C.}\ (10^{-7}/°\ C.)$ | 21.6 | 22.8 | 25.0 | 20.9 | 20.7 | 22.0 | 20.3 |
| $CTE_{500-900°\ C.}\ (10^{-7}/°\ C.)$ | 24.1 | 25.5 | 27.6 | 23.2 | 23.3 | 24.7 | 22.8 |
| Transverse I-ratio | 0.70 | | | 0.71 | | 0.70 | |

TABLE 15-continued

Firing schedules and physical properties of Examples 17 to 19

| | 17A | 17B | 17C | 18A | 18B | 19A | 19B |
|---|---|---|---|---|---|---|---|
| | | | | Composition | | | |
| | Q | Q | Q | R | R | S | S |
| Axial I-ratio | — | | | 0.58 | | 0.56 | |
| % Mullite | 0 | | | 0 | | 0 | |
| % Spinel + Sapphirine | 5.8 | | | 3.3 | | 6.3 | |
| % Alumina | 0 | | | 0 | | 0 | |
| MOR (psi) | 640 | 537 | 510 | 755 | 724 | 635 | 556 |
| MOR/CFA (psi) | 2015 | 1657 | 1596 | 2483 | 2373 | 2109 | 1840 |
| % MOR Retention | | 84% | 80% | | 96% | | 88% |
| $E_{25°C.}$ (psi) | 2.34E+05 | 2.39E+05 | 2.32E+05 | 4.67E+05 | 4.60E+05 | 3.69E+05 | 3.70E+05 |
| $E_{800°C.}$ (psi) | 2.19E+05 | 2.27E+05 | 2.19E+05 | 4.41E+05 | 4.35E+05 | 3.47E+05 | 3.52E+05 |
| $E_{900°C.}$ (psi) | 2.08E+05 | 2.17E+05 | 2.08E+05 | 4.18E+05 | 4.14E+05 | 3.24E+05 | 3.41E+05 |
| $E_{1000°C.}$ (psi) | 1.80E+05 | 2.00E+05 | 1.89E+05 | 3.75E+05 | 3.86E+05 | 2.95E+05 | 3.18E+05 |
| $E_{800°C.}/E_{25°C.}$ | 0.936 | 0.950 | 0.944 | 0.944 | 0.946 | 0.940 | 0.951 |
| $E_{900°C.}/E_{25°C.}$ | 0.889 | 0.908 | 0.897 | 0.895 | 0.900 | 0.878 | 0.922 |
| $E_{1000°C.}/E_{25°C.}$ | 0.769 | 0.837 | 0.815 | 0.803 | 0.839 | 0.799 | 0.859 |
| $Nb^3$ | 0.009 | 0.015 | 0.009 | 0.014 | 0.020 | 0.015 | 0.021 |
| MOR/E × $10^2$ | 0.274 | 0.225 | 0.220 | 0.162 | 0.157 | 0.172 | 0.150 |
| $TSL_{200}$ (° C.) | 1467 | 1187 | 1079 | 975 | 960 | 983 | 940 |
| $TSL_{500}$ (° C.) | 1637 | 1380 | 1297 | 1196 | 1175 | 1197 | 1158 |

TABLE 16

Firing schedules and physical properties of Examples 25 and 28

| | 25A | 25B | 26A | 26B | 27A | 27B | 28A | 28B |
|---|---|---|---|---|---|---|---|---|
| | | | | | Composition | | | |
| | X | X | Y | Y | Z | Z | AA | AA |
| Condition | As-fired | 950° C./82 h | As-fired | 950° C./82 h | As-fired | 950° C./82 h | As-fired | 950° C./82 h |
| 800-900 Heating Rate | 75 | 50 | 75 | 50 | 75 | 50 | 75 | 50 |
| 1150-1200 Heating Rate | 20 | 50 | 20 | 50 | 20 | 50 | 20 | 50 |
| 1200-1300 Heating Rate | 10 | 50 | 10 | 50 | 10 | 50 | 10 | 50 |
| 1300-1350 Heating Rate | 10 | 50 | 10 | 50 | 10 | 50 | 10 | 50 |
| 1350-Tmax Heating Rate | 10 | 50 | 10 | 50 | 10 | 50 | 10 | 50 |
| Tmax (° C.) | 1380 | 950 | 1380 | 950 | 1380 | 950 | 1380 | 950 |
| Hold (h) | 20 | 82 | 20 | 82 | 20 | 82 | 20 | 82 |
| Nominal Cell Geometry | 300/13 | 300/13 | 300/13 | 300/13 | 300/13 | 300/13 | 300/13 | 300/13 |
| Density of Cellular Bar (g/cm³) | 0.424 | 0.429 | 0.414 | 0.426 | 0.431 | 0.442 | 0.432 | 0.424 |
| CFA | 0.408 | 0.413 | 0.409 | 0.421 | 0.432 | 0.443 | 0.439 | 0.431 |
| % Porosity | 58.6 | | 59.6 | | 60.2 | | 60.8 | |
| $d_1$ | 6.7 | | 6.3 | | 6.6 | | 4.1 | |
| $d_2$ | 7.2 | | 7.0 | | 7.0 | | 4.5 | |
| $d_5$ | 8.1 | | 8.0 | | 7.9 | | 5.5 | |
| $d_{10}$ | 9.1 | | 9.2 | | 9.0 | | 6.5 | |
| $d_{25}$ | 10.8 | | 11.2 | | 10.9 | | 8.2 | |
| $d_{50}$ | 12.7 | | 13.2 | | 12.8 | | 9.7 | |
| $d_{75}$ | 14.8 | | 15.2 | | 14.6 | | 11.0 | |
| $d_{90}$ | 21.8 | | 21.9 | | 20.5 | | 14.1 | |
| $d_{95}$ | 54.2 | | 49.5 | | 58.1 | | 27.2 | |
| $d_{98}$ | 155.9 | | 152.6 | | 173.5 | | 143.0 | |
| $d_{99}$ | 213.3 | | 213.1 | | 229.0 | | 212.9 | |
| $d_f = (d_{50} - d_{10})/d_{50}$ | 0.29 | | 0.30 | | 0.30 | | 0.33 | |
| $d_b = (d_{90} - d_{10})/d_{50}$ | 1.00 | | 0.97 | | 0.90 | | 0.78 | |
| $PCF_b$ = % Porosity/$d_b$ | 59 | | 62 | | 67 | | 78 | |
| $PCF_f$ = % Porosity/$d_f$ | 205 | | 197 | | 201 | | 182 | |
| $CTE_{25-800°C.}$ ($10^{-7}$/° C.) | 18.9 | 15.3 | 16.7 | 13.9 | 17.0 | 15.3 | 15.1 | 13.9 |
| $CTE_{200-1000°C.}$ ($10^{-7}$/° C.) | 20.5 | 19.5 | 20.8 | 18.1 | 21.6 | 19.1 | 18.7 | 18.4 |
| $CTE_{500-900°C.}$ ($10^{-7}$/° C.) | 22.6 | 22.2 | 23.2 | 20.8 | 24.7 | 22.0 | 21.1 | 20.8 |
| Transverse I-ratio | 0.79 | | 0.79 | | 0.77 | | 0.78 | |
| Axial I-ratio | 0.53 | | 0.55 | | 0.55 | | 0.49 | |
| % Mullite | 0 | | 0 | | 0 | | 0 | |
| % Spinel + Sapphirine | 3.3 | | 3.6 | | 2.1 | | 4.3 | |
| % Alumina | 1.4 | | 1.2 | | 0 | | 0 | |
| MOR (psi) | 916 | 911 | 942 | 880 | 1187 | 1161 | 942 | 990 |
| MOR/CFA (psi) | 2245 | 2207 | 2304 | 2093 | 2750 | 2623 | 2144 | 2297 |

TABLE 16-continued

Firing schedules and physical properties of Examples 25 and 28

| | 25A | 25B | 26A | 26B | 27A | 27B | 28A | 28B |
|---|---|---|---|---|---|---|---|---|
| | | | | | Composition | | | |
| | X | X | Y | Y | Z | Z | AA | AA |
| % MOR Retention | | 99% | | 93% | | 98% | | 105% |
| $E_{25°\,C.}$ (psi) | 4.29E+05 | 4.44E+05 | 4.11E+05 | 4.43E+05 | 4.65E+05 | 5.29E+05 | 5.06E+05 | 4.88E+05 |
| $E_{800°\,C.}$ (psi) | 4.22E+05 | 4.30E+05 | 4.00E+05 | 4.29E+05 | 4.42E+05 | 5.02E+05 | 4.91E+05 | 4.76E+05 |
| $E_{900°\,C.}$ (psi) | 4.15E+05 | 4.24E+05 | 3.91E+05 | 4.23E+05 | 4.30E+05 | 4.89E+05 | 4.81E+05 | 4.72E+05 |
| $E_{1000°\,C.}$ (psi) | 4.05E+05 | 4.17E+05 | 3.87E+05 | 4.17E+05 | 3.69E+05 | 4.38E+05 | 4.72E+05 | 4.62E+05 |
| $E_{800°\,C.}/E_{25°\,C.}$ | 0.984 | 0.968 | 0.973 | 0.968 | 0.951 | 0.949 | 0.970 | 0.975 |
| $E_{900°\,C.}/E_{25°\,C.}$ | 0.967 | 0.955 | 0.951 | 0.955 | 0.925 | 0.924 | 0.951 | 0.967 |
| $E_{1000°\,C.}/E_{25°\,C.}$ | 0.944 | 0.939 | 0.942 | 0.941 | 0.794 | 0.828 | 0.933 | 0.947 |
| $Nb^3$ | 0.046 | 0.031 | 0.037 | 0.029 | 0.020 | 0.016 | 0.035 | 0.039 |
| MOR/E × $10^2$ | 0.213 | 0.205 | 0.229 | 0.199 | 0.255 | 0.220 | 0.186 | 0.203 |
| $TSL_{200}$ (° C.) | 1242 | 1251 | 1302 | 1296 | 1382 | 1348 | 1195 | 1302 |
| $TSL_{500}$ (° C.) | 1447 | 1423 | 1488 | 1455 | 1535 | 1498 | 1381 | 1477 |

TABLE 17

Firing schedules and physical properties of Examples 29 to 32.

| | 29A | 29B | 30A | 30B | 31A | 31B | 32A | 32B |
|---|---|---|---|---|---|---|---|---|
| | | | | | Composition | | | |
| | BB | BB | BB | BB | BB | BB | BB | BB |
| Condition | As-fired | 950° C./82 h | As-fired | 950° C./82 h | As-fired | 950° C./82 h | As-fired | 950° C./82 h |
| 750-950 Heating Rate | 5 | 50 | 20 | 50 | 20 | 50 | 20 | 50 |
| 950-1150 Heating Rate | 20 | 50 | 5 | 50 | 20 | 50 | 20 | 50 |
| 1150-1250 Heating Rate | 20 | 50 | 20 | 50 | 5 | 50 | 20 | 50 |
| 1250-1320 Heating Rate | 20 | 50 | 20 | 50 | 20 | 50 | 5 | 50 |
| 1320-Tmax Heating Rate | 20 | 50 | 20 | 50 | 20 | 50 | 20 | 50 |
| Tmax (° C.) | 1380 | 950 | 1380 | 950 | 1380 | 950 | 1380 | 950 |
| Hold (h) | 20 | 82 | 20 | 82 | — d° | 82 | 20 | 82 |
| Nominal Cell Geometry | 300/13 | | 300/13 | | 300/13 | | 300/13 | |
| Density of Cellular Bar (g/cm$^3$) | 0.425 | 0.417 | 0.422 | 0.413 | 0.415 | 0.410 | 0.416 | 0.417 |
| CFA | 0.472 | 0.463 | 0.451 | 0.441 | 0.441 | 0.436 | 0.450 | 0.451 |
| % Porosity | 64.1 | | 62.7 | | 62.5 | | 63.2 | |
| $d_1$ | 4.0 | | 3.1 | | 3.9 | | 3.4 | |
| $d_2$ | 4.8 | | 3.9 | | 4.5 | | 4.5 | |
| $d_5$ | 6.0 | | 5.2 | | 5.5 | | 5.6 | |
| $d_{10}$ | 7.4 | | 6.5 | | 6.6 | | 7.0 | |
| $d_{25}$ | 9.7 | | 8.9 | | 8.6 | | 9.1 | |
| $d_{50}$ | 11.9 | | 11.3 | | 10.9 | | 11.3 | |
| $d_{75}$ | 14.6 | | 13.9 | | 13.1 | | 13.2 | |
| $d_{90}$ | 19.0 | | 17.7 | | 16.5 | | 16.2 | |
| $d_{95}$ | 29.8 | | 22.6 | | 20.8 | | 22.1 | |
| $d_{98}$ | 129.6 | | 62.1 | | 49.1 | | 63.6 | |
| $d_{99}$ | 229.6 | | 126.8 | | 111.2 | | 145.1 | |
| $d_f = (d_{50} - d_{10})/d_{50}$ | 0.38 | | 0.42 | | 0.39 | | 0.38 | |
| $d_b = (d_{90} - d_{10})/d_{50}$ | 0.97 | | 0.99 | | 0.91 | | 0.81 | |
| $PCF_b$ = % Porosity/$d_b$ | 66 | | 63 | | 69 | | 78 | |
| $PCF_f$ = % Porosity/$d_f$ | 170 | | 148 | | 159 | | 167 | |
| $CTE_{25-800°\,C.}$ ($10^{-7}$/° C.) | 18.9 | 19.3 | 19.9 | 18.5 | 17.7 | 19.4 | 19.5 | 18.4 |
| $CTE_{200-1000°\,C.}$ ($10^{-7}$/° C.) | 23.3 | 22.7 | 24.5 | 21.7 | 21.9 | 23.2 | 23.2 | 22.0 |
| $CTE_{500-900°\,C.}$ ($10^{-7}$/° C.) | 26.0 | 25.7 | 27.5 | 24.5 | 24.5 | 26.3 | 26.0 | 24.9 |
| Transverse I-ratio | 0.61 | | 0.61 | | 0.62 | | 0.62 | |
| Axial I-ratio | 0.56 | | 0.57 | | 0.60 | | 0.59 | |
| % Mullite | 0 | | 0 | | 0.7 | | 0 | |
| % Spinel + Sapphirine | 6.1 | | 6.9 | | 5.2 | | 5.9 | |
| % Alumina | 0.5 | | 0.5 | | 0 | | 0 | |
| MOR (psi) | 1050 | 1156 | 1065 | 1028 | 998 | 1101 | 1028 | 1145 |
| MOR/CFA (psi) | 2225 | 2497 | 2362 | 2331 | 2263 | 2526 | 2285 | 2538 |
| % MOR Retention | | 110% | | 97% | | 110% | | 111% |
| $E_{25°\,C.}$ (psi) | 4.63E+05 | 4.60E+05 | 4.76E+05 | 4.96E+05 | 4.59E+05 | 4.38E+05 | 4.44E+05 | 4.70E+05 |
| $E_{800°\,C.}$ (psi) | 4.35E+05 | 4.36E+05 | 4.46E+05 | 4.66E+05 | 4.33E+05 | 4.12E+05 | 4.16E+05 | 4.41E+05 |
| $E_{900°\,C.}$ (psi) | 4.20E+05 | 4.16E+05 | 4.29E+05 | 4.54E+05 | 4.21E+05 | 4.00E+05 | 3.97E+05 | 4.30E+05 |
| $E_{1000°\,C.}$ (psi) | 3.88E+05 | 3.69E+05 | 3.88E+05 | 4.10E+05 | 3.74E+05 | 3.56E+05 | 3.56E+05 | 3.90E+05 |
| $E_{800°\,C.}/E_{25°\,C.}$ | 0.940 | 0.948 | 0.937 | 0.940 | 0.943 | 0.941 | 0.937 | 0.938 |

TABLE 17-continued

Firing schedules and physical properties of Examples 29 to 32.

| | Example No. | | | | | | | |
|---|---|---|---|---|---|---|---|---|
| | 29A | 29B | 30A | 30B | 31A | 31B | 32A | 32B |
| | | | | Composition | | | | |
| | BB | BB | BB | BB | BB | BB | BB | BB |
| $E_{900°\,C.}/E_{25°\,C.}$ | 0.907 | 0.904 | 0.901 | 0.915 | 0.917 | 0.913 | 0.894 | 0.915 |
| $E_{1000°\,C.}/E_{25°\,C.}$ | 0.838 | 0.802 | 0.815 | 0.827 | 0.815 | 0.813 | 0.802 | 0.830 |
| $Nb^3$ | 0.009 | 0.001 | 0.009 | 0.006 | 0.011 | 0.009 | 0.010 | 0.007 |
| $MOR/E \times 10^2$ | 0.227 | 0.251 | 0.224 | 0.207 | 0.217 | 0.251 | 0.232 | 0.244 |
| $TSL_{200}$ (° C.) | 1173 | 1307 | 1114 | 1156 | 1193 | 1285 | 1198 | 1309 |
| $TSL_{500}$ (° C.) | 1372 | 1477 | 1315 | 1348 | 1388 | 1457 | 1392 | 1477 |

TABLE 18

Firing schedules and physical properties of Examples 33 to 36.

| | Example No. | | | | | | | |
|---|---|---|---|---|---|---|---|---|
| | 33A | 33B | 34A | 34B | 35A | 35B | 36A | 36B |
| | | | | Composition | | | | |
| | CC | CC | DD | DD | EE | EE | FF | FF |
| Condition | As-fired | 800/1100° C. | As-fired | 800/1100° C. | As-fired | 800/1100° C. | As-fired | 800/1100° C. |
| 800-900 Heating Rate | 75 | — | 75 | — | 75 | — | 75 | — |
| 1150-1200 Heating Rate | 20 | — | 20 | — | 20 | — | 20 | — |
| 1200-1300 Heating Rate | 10 | — | 10 | — | 10 | — | 10 | — |
| 1300-1350 Heating Rate | 10 | — | 10 | — | 10 | — | 10 | — |
| 1350-Tmax Heating Rate | 10 | — | 10 | — | 10 | — | 10 | — |
| Tmax (° C.) | 1380 | — | 1380 | — | 1380 | — | 1380 | — |
| Hold (h) | 20 | — | 20 | — | 20 | — | 20 | — |
| Nominal Cell Geometry | 300/13 | | 300/13 | | 300/13 | | 300/13 | |
| Density of Cellular Bar (g/cm$^3$) | 0.393 | 0.386 | 0.381 | 0.373 | 0.407 | 0.408 | 0.397 | 0.405 |
| CFA | 0.438 | 0.430 | 0.415 | 0.406 | 0.443 | 0.444 | 0.433 | 0.441 |
| % Porosity | 64.3 | | 63.4 | | 63.4 | | 63.4 | |
| $d_1$ | 6.2 | | 4.7 | | 4.9 | | 3.4 | |
| $d_2$ | 7.9 | | 5.8 | | 6.4 | | 4.5 | |
| $d_5$ | 10.6 | | 8.2 | | 9.1 | | 6.9 | |
| $d_{10}$ | 13.3 | | 10.4 | | 11.6 | | 9.3 | |
| $d_{25}$ | 17.7 | | 14.0 | | 15.5 | | 13.2 | |
| $d_{50}$ | 21.5 | | 17.4 | | 19.3 | | 16.6 | |
| $d_{75}$ | 26.2 | | 20.3 | | 23.6 | | 20.1 | |
| $d_{90}$ | 35.9 | | 28.4 | | 30.9 | | 28.7 | |
| $d_{95}$ | 76.0 | | 58.5 | | 73.4 | | 64.1 | |
| $d_{98}$ | 177.3 | | 159.1 | | 190.3 | | 164.6 | |
| $d_{99}$ | 241.5 | | 230.7 | | 251.3 | | 228.9 | |
| $d_f = (d_{50} - d_{10})/d_{50}$ | 0.38 | | 0.40 | | 0.40 | | 0.44 | |
| $d_b = (d_{90} - d_{10})/d_{50}$ | 1.05 | | 1.04 | | 1.00 | | 1.17 | |
| $PCF_b$ = % Porosity/$d_b$ | 61 | | 61 | | 63 | | 54 | |
| $PCF_f$ = % Porosity/$d_f$ | 168 | | 158 | | 159 | | 144 | |
| $CTE_{25-800°\,C.}$ (10$^{-7}$/° C.) | 17.1 | 16.3 | 17.8 | 16.7 | 18.0 | 16.7 | 18.4 | 17.3 |
| $CTE_{200-1000°\,C.}$ (10$^{-7}$/° C.) | 21.9 | 20.5 | 22.1 | 20.9 | 21.9 | 20.7 | 22.9 | 21.1 |
| $CTE_{500-900°\,C.}$ (10$^{-7}$/° C.) | 24.4 | 23.7 | 25.0 | 24.0 | 25.0 | 23.7 | 25.9 | 24.1 |
| Transverse I-ratio | 0.64 | | 0.65 | | 0.66 | | 0.65 | |
| Axial I-ratio | 0.64 | | 0.62 | | 0.63 | | 0.62 | |
| % Mullite | 0 | | 0 | | 0 | | 0 | |
| % Spinel + Sapphirine | 3.2 | | 4.1 | | 2.9 | | 3.3 | |
| % Alumina | 0 | | 0.5 | | 0 | | 0 | |
| MOR (psi) | 687 | 596 | 722 | 685 | 829 | 710 | 892 | 849 |
| MOR/CFA (psi) | 1568 | 1385 | 1738 | 1685 | 1871 | 1598 | 2061 | 1924 |
| % MOR Retention | | 87% | | 95% | | 86% | | 95% |
| $E_{25°\,C.}$ (psi) | 3.71E+05 | 3.51E+05 | 3.51E+05 | 3.49E+05 | 4.19E+05 | 4.66E+05 | 3.76E+05 | 4.27E+05 |
| $E_{800°\,C.}$ (psi) | 3.49E+05 | 3.31E+05 | 3.30E+05 | 3.30E+05 | 3.93E+05 | 4.34E+05 | 3.54E+05 | 3.98E+05 |
| $E_{900°\,C.}$ (psi) | 3.36E+05 | 3.21E+05 | 3.15E+05 | 3.16E+05 | 3.72E+05 | 4.08E+05 | 3.20E+05 | 3.75E+05 |
| $E_{1000°\,C.}$ (psi) | 3.12E+05 | 3.03E+05 | 2.79E+05 | 2.80E+05 | 3.17E+05 | 3.54E+05 | 2.65E+05 | 3.09E+05 |
| $E_{800°\,C.}/E_{25°\,C.}$ | 0.941 | 0.943 | 0.940 | 0.946 | 0.938 | 0.931 | 0.941 | 0.932 |
| $E_{900°\,C.}/E_{25°\,C.}$ | 0.906 | 0.915 | 0.897 | 0.905 | 0.888 | 0.876 | 0.851 | 0.878 |
| $E_{1000°\,C.}/E_{25°\,C.}$ | 0.841 | 0.863 | 0.795 | 0.802 | 0.757 | 0.760 | 0.705 | 0.724 |
| $Nb^3$ | 0.004 | 0.008 | 0.007 | 0.011 | 0.005 | 0.003 | 0.012 | 0.004 |
| $MOR/E \times 10^2$ | 0.185 | 0.170 | 0.206 | 0.196 | 0.198 | 0.152 | 0.237 | 0.199 |
| $TSL_{200}$ (° C.) | 1046 | 1030 | 1129 | 1139 | 1106 | 935 | 1238 | 1143 |
| $TSL_{500}$ (° C.) | 1260 | 1216 | 1323 | 1318 | 1291 | 1143 | 1415 | 1327 |

TABLE 19

Firing schedules and physical properties of Examples 37 to 40.

| | 37A | 37B | 38A | 38B | 39A | 39B | 40A | 40B |
|---|---|---|---|---|---|---|---|---|
| Composition | GG | GG | HH | HH | II | II | JJ | JJ |
| Condition | As-fired | 950° C./82 h | As-fired | 950° C./82 h | As-fired | 950° C./82 h | As-fired | 950° C./82 h |
| 800-900 Heating Rate | 63 | 50 | 63 | 50 | 63 | 50 | 63 | 50 |
| 1150-1200 Heating Rate | 77 | 50 | 77 | 50 | 77 | 50 | 77 | 50 |
| 1200-1300 Heating Rate | 77 | 50 | 77 | 50 | 77 | 50 | 77 | 50 |
| 1300-1350 Heating Rate | 7 | 50 | 7 | 50 | 7 | 50 | 7 | 50 |
| 1350-Tmax Heating Rate | 5 | 50 | 5 | 50 | 5 | 50 | 5 | 50 |
| Tmax (° C.) | 1418 | 950 | 1418 | 950 | 1418 | 950 | 1418 | 950 |
| Hold (h) | 12 | 82 | 12 | 82 | 12 | 82 | 12 | 82 |
| Nominal Cell Geometry | 275/8 | 275/8 | 275/8 | 275/8 | 275/8 | 275/8 | 275/8 | 275/8 |
| Density of Cellular Bar (g/cm$^3$) | 0.280 | 0.280 | 0.283 | 0.283 | 0.275 | 0.275 | 0.316 | 0.316 |
| CFA | 0.303 | 0.303 | 0.308 | 0.308 | 0.297 | 0.297 | 0.312 | 0.312 |
| % Porosity | 63.2 | 63.2 | 63.4 | 63.4 | 63.1 | 63.1 | 59.7 | 59.7 |
| $d_1$ | 7.5 | | 7.5 | | 7.9 | | 4.2 | |
| $d_2$ | 8.5 | | 8.8 | | 8.7 | | 4.8 | |
| $d_5$ | 10.1 | | 10.6 | | 10.1 | | 5.9 | |
| $d_{10}$ | 11.4 | | 12.1 | | 11.4 | | 7.2 | |
| $d_{25}$ | 13.7 | | 14.4 | | 13.5 | | 9.5 | |
| $d_{50}$ | 15.8 | | 16.5 | | 15.4 | | 11.2 | |
| $d_{75}$ | 18.2 | | 19.0 | | 17.2 | | 12.7 | |
| $d_{90}$ | 25.5 | | 28.0 | | 22.2 | | 15.9 | |
| $d_{95}$ | 41.8 | | 56.6 | | 36.5 | | 21.6 | |
| $d_{98}$ | 100.9 | | 137.1 | | 98.8 | | 53.4 | |
| $d_{99}$ | 158.7 | | 194.8 | | 159.0 | | 99.1 | |
| $d_f = (d_{50} - d_{10})/d_{50}$ | 0.28 | | 0.27 | | 0.26 | | 0.36 | |
| $d_b = (d_{90} - d_{10})/d_{50}$ | 0.89 | | 0.97 | | 0.70 | | 0.78 | |
| $PCF_b$ = % Porosity/$d_b$ | 71 | | 66 | | 90 | | 77 | |
| $PCF_f$ = % Porosity/$d_f$ | 228 | | 236 | | 242 | | 165 | |
| $CTE_{25-800°\,C.}$ ($10^{-7}$/° C.) | 16.9 | 16.6 | 17.5 | 17.1 | 17.7 | 16.7 | 16.7 | 17.2 |
| $CTE_{200-1000°\,C.}$ ($10^{-7}$/° C.) | 20.6 | 20.5 | 21.3 | 21.2 | 21.1 | 20.7 | 21.2 | 21.2 |
| $CTE_{500-900°\,C.}$ ($10^{-7}$/° C.) | 22.9 | 23.0 | 23.8 | 23.9 | 23.5 | 23.2 | 23.9 | 23.7 |
| Transverse I-ratio | 0.70 | | 0.77 | | 0.68 | | 0.72 | |
| Axial I-ratio | 0.52 | | 0.57 | | 0.61 | | 0.58 | |
| % Mullite | 0.0 | | 0.0 | | 0.0 | | 0.0 | |
| % Spinel + Sapphirine | 0.39 | | 0.34 | | 0.41 | | 0.34 | |
| % Alumina | 0.0 | | 0.0 | | 0.0 | | 0.0 | |
| MOR (psi) | 611 | 558 | 635 | 559 | 636 | 618 | 781 | 753 |
| MOR/CFA (psi) | 2018 | 1842 | 2058 | 1813 | 2144 | 2084 | 2499 | 2410 |
| % MOR Retention | | 91% | | 88% | | 97% | | 96% |
| $E_{25°\,C.}$ (psi) | 2.82E+05 | 3.02E+05 | 2.90E+05 | 2.96E+05 | 2.94E+05 | 2.99E+05 | 4.45E+05 | 4.33E+05 |
| $E_{800°\,C.}$ (psi) | — | 2.86E+05 | — | 2.81E+05 | — | 2.82E+05 | — | 4.11E+05 |
| $E_{900°\,C.}$ (psi) | — | 2.79E+05 | — | 2.67E+05 | — | 2.72E+05 | — | 4.02E+05 |
| $E_{1000°\,C.}$ (psi) | — | 2.59E+05 | — | 2.50E+05 | — | 2.54E+05 | — | 3.70E+05 |
| $E_{800°\,C.}/E_{25°\,C.}$ | — | 0.947 | — | 0.949 | — | 0.943 | — | 0.949 |
| $E_{900°\,C.}/E_{25°\,C.}$ | — | 0.924 | — | 0.902 | — | 0.910 | — | 0.928 |
| $E_{1000°\,C.}/E_{25°\,C.}$ | — | 0.858 | — | 0.845 | — | 0.849 | — | 0.855 |
| $Nb^3$ | — | 0.016 | — | 0.010 | — | 0.010 | — | 0.022 |
| MOR/E × $10^2$ | 0.217 | 0.185 | 0.219 | 0.189 | 0.216 | 0.207 | 0.175 | 0.174 |
| $TSL_{200}$ (° C.) | 1253 | 1101 | 1229 | 1090 | 1226 | 1199 | 1027 | 1022 |
| $TSL_{500}$ (° C.) | 1446 | 1303 | 1419 | 1289 | 1423 | 1390 | 1234 | 1234 |

TABLE 20

Firing schedules and physical properties of Examples 41 to 43.

| | 41A | 41B | 42A | 42B | 43A | 43B |
|---|---|---|---|---|---|---|
| Composition | KK | KK | LL | LL | MM | MM |
| Condition | As-fired | 950° C./82 h | As-fired | 950° C./82 h | As-fired | 950° C./82 h |
| 800-900 Heating Rate | 63 | 50 | 63 | 50 | 63 | 50 |
| 1150-1200 Heating Rate | 77 | 50 | 75 | 50 | 75 | 50 |
| 1200-1300 Heating Rate | 77 | 50 | 75 | 50 | 75 | 50 |
| 1300-1350 Heating Rate | 6 | 50 | 8 | 50 | 8 | 50 |
| 1350-Tmax Heating Rate | 6 | 50 | 7 | 50 | 7 | 50 |

TABLE 20-continued

Firing schedules and physical properties of Examples 41 to 43.

| | 41A | 41B | 42A | 42B | 43A | 43B |
|---|---|---|---|---|---|---|
| | \multicolumn{6}{c}{Composition} | | | | | |
| | KK | KK | LL | LL | MM | MM |
| Tmax (° C.) | 1400 | 950 | 1418 | 950 | 1418 | 950 |
| Hold (h) | 12 | 82 | 12 | 82 | 12 | 82 |
| Nominal Cell Geometry | 275/8 | 275/8 | 275/8 | 275/8 | 275/8 | 275/8 |
| Density of Cellular Bar (g/cm³) | 0.338 | 0.338 | 0.286 | 0.279 | 0.29 | 0.291 |
| CFA | 0.326 | 0.326 | 0.322 | 0.314 | 0.316 | 0.317 |
| % Porosity | 58.7 | | 64.6 | | 63.5 | |
| $d_1$ | 4.8 | | 9.1 | | 8.3 | |
| $d_2$ | 5.5 | | 10.2 | | 9.4 | |
| $d_5$ | 6.6 | | 11.9 | | 10.9 | |
| $d_{10}$ | 7.6 | | 13.4 | | 12.3 | |
| $d_{25}$ | 9.5 | | 15.6 | | 14.4 | |
| $d_{50}$ | 11.2 | | 17.4 | | 16.2 | |
| $d_{75}$ | 13.1 | | 19.8 | | 18.5 | |
| $d_{90}$ | 16.4 | | 25.4 | | 23.4 | |
| $d_{95}$ | 23.8 | | 39.0 | | 39.4 | |
| $d_{98}$ | 79.4 | | 95.4 | | 105.5 | |
| $d_{99}$ | 156.1 | | 155.3 | | 164.6 | |
| $d_f = (d_{50} - d_{10})/d_{50}$ | 0.32 | | 0.23 | | 0.24 | |
| $d_b = (d_{90} - d_{10})/d_{50}$ | 0.78 | | 0.69 | | 0.68 | |
| $PCF_b = \% \text{Porosity}/d_b$ | 75 | | 94 | | 94 | |
| $PCF_f = \% \text{Porosity}/d_f$ | 185 | | 283 | | 264 | |
| $CTE_{25\text{-}800° C.}$ ($10^{-7}/°$ C.) | 20.0 | 18.0 | 16.6 | 16.9 | 17.6 | 17.7 |
| $CTE_{200\text{-}1000° C.}$ ($10^{-7}/°$ C.) | 24.0 | 21.6 | 20.3 | 20.7 | 22.2 | 22.0 |
| $CTE_{500\text{-}900° C.}$ ($10^{-7}/°$ C.) | 26.9 | 24.6 | 23.0 | 23.4 | 24.9 | 24.7 |
| Transverse I-ratio | 0.64 | | 0.72 | | 0.67 | |
| Axial I-ratio | 0.57 | | 0.55 | | 0.61 | |
| % Mullite | 0.5 | | 0 | | 0 | |
| % Spinel + Sapphirine | 6.8 | | 4.1 | | 3.5 | |
| % Alumina | 0 | | 0 | | 0 | |
| MOR (psi) | 851.2 | 798 | 512.6 | 496 | 534.5 | 461 |
| MOR/CFA (psi) | 2609 | 2446 | 1592 | 1579 | 1690 | 1452 |
| % MOR Retention | | 94% | | 97% | | 86% |
| $E_{25° C.}$ (psi) | 4.96E+05 | 4.84E+05 | 2.56E+05 | 2.47E+05 | 2.64E+05 | 2.84E+05 |
| $E_{800° C.}$ (psi) | — | 4.59E+05 | 2.41E+05 | 2.34E+05 | 2.51E+05 | 2.69E+05 |
| $E_{900° C.}$ (psi) | — | 4.43E+05 | 2.29E+05 | 2.25E+05 | 2.39E+05 | 2.59E+05 |
| $E_{1000° C.}$ (psi) | — | 4.18E+05 | 2.11E+05 | 2.11E+05 | 2.17E+05 | 2.41E+05 |
| $E_{800° C.}/E_{25° C.}$ | — | 0.948 | 0.941 | 0.947 | 0.951 | 0.947 |
| $E_{900° C.}/E_{25° C.}$ | — | 0.915 | 0.895 | 0.911 | 0.905 | 0.912 |
| $E_{1000° C.}/E_{25° C.}$ | — | 0.864 | 0.824 | 0.854 | 0.822 | 0.849 |
| $Nb^3$ | — | 0.006 | 0.011 | 0.011 | 0.009 | 0.011 |
| $MOR/E \times 10^2$ | 0.172 | 0.165 | 0.200 | 0.201 | 0.202 | 0.162 |
| $TSL_{200}$ (° C.) | 915 | 964 | 1185 | 1168 | 1113 | 939 |
| $TSL_{500}$ (° C.) | 1139 | 1170 | 1372 | 1359 | 1314 | 1157 |

TABLE 21

Firing schedules and physical properties of Examples 44 to 45.

| | 44A | 44B | 45A | 45B |
|---|---|---|---|---|
| Composition | NN | NN | OO | OO |
| Condition | As-fired | 950° C./82 h | As-fired | 950° C./82 h |
| 800-900 Heating Rate | 34 | 50 | 34 | 50 |
| 1150-1200 Heating Rate | 75 | 50 | 75 | 50 |
| 1200-1300 Heating Rate | 75 | 50 | 75 | 50 |
| 1300-1350 Heating Rate | 6 | 50 | 6 | 50 |
| 1350-Tmax Heating Rate | 6 | 50 | 6 | 50 |
| Tmax (° C.) | 1415 | 950 | 1415 | 950 |
| Hold (h) | 30 | 82 | 30 | 82 |
| Nominal Cell Geometry | 275/14 | 275/14 | 275/14 | 275/14 |
| Density of Cellular Bar (g/cm³) | 0.516 | 0.483 | 0.507 | 0.497 |
| CFA | 0.463 | 0.433 | 0.444 | 0.435 |
| % Porosity | 55.6 | | 54.5 | |
| $d_1$ | 7.7 | | 8.1 | |
| $d_2$ | 8.9 | | 9.1 | |
| $d_5$ | 10.7 | | 10.3 | |
| $d_{10}$ | 12.3 | | 11.5 | |
| $d_{25}$ | 15.0 | | 13.2 | |
| $d_{50}$ | 18.3 | | 15.1 | |
| $d_{75}$ | 21.5 | | 16.9 | |
| $d_{90}$ | 29.2 | | 20.0 | |
| $d_{95}$ | 56.0 | | 25.6 | |
| $d_{98}$ | 139.6 | | 47.6 | |
| $d_{99}$ | 200.7 | | 74.7 | |
| $d_f = (d_{50} - d_{10})/d_{50}$ | 0.33 | | 0.24 | |
| $d_b = (d_{90} - d_{10})/d_{50}$ | 0.92 | | 0.57 | |
| $PCF_b = \% \text{Porosity}/d_b$ | 60 | | 96 | |
| $PCF_f = \% \text{Porosity}/d_f$ | 170 | | 227 | |
| $CTE_{25\text{-}800° C.}$ ($10^{-7}/°$ C.) | 12.7 | 11.4 | 14.7 | 8.7 |
| $CTE_{200\text{-}1000° C.}$ | 16.7 | 15.6 | 19.3 | 13.4 |

TABLE 21-continued

Firing schedules and physical properties of Examples 44 to 45.

| | Example No. | | | |
|---|---|---|---|---|
| | 44A | 44B | 45A | 45B |
| $CTE_{500\text{-}900^\circ C.}$ ($10^{-7}/^\circ C.$) | 19.3 | 18.2 | 22.1 | 15.9 |
| ($10^{-7}/^\circ C.$) | | | | |
| Transverse I-ratio | 0.82 | | 0.79 | |
| Axial I-ratio | 0.54 | | — | |
| % Mullite | 0 | | 0 | |
| % Spinel + Sapphirine | 0.9 | | 1.3 | |
| % Alumina | 0 | | 0 | |
| MOR (psi) | 1421 | 732 | 1669.1 | 440.2 |
| MOR/CFA (psi) | 3069 | 1689 | 3760 | 1012 |
| % MOR Retention | | 52% | | 26% |
| $E_{25^\circ C.}$ (psi) | 8.35E+05 | 6.12E+05 | 7.68E+05 | 4.80E+05 |
| $E_{800^\circ C.}$ (psi) | 8.00E+05 | 6.21E+05 | 7.26E+05 | 5.33E+05 |
| $E_{900^\circ C.}$ (psi) | 8.00E+05 | 6.45E+05 | 7.11E+05 | 5.71E+05 |
| $E_{1000^\circ C.}$ (psi) | 7.58E+05 | 6.69E+05 | 6.39E+05 | 6.38E+05 |
| $E_{800^\circ C.}/E_{25^\circ C.}$ | 0.958 | 1.015 | 0.945 | 1.110 |
| $E_{900^\circ C.}/E_{25^\circ C.}$ | 0.958 | 1.054 | 0.926 | 1.190 |
| $E_{1000^\circ C.}/E_{25^\circ C.}$ | 0.908 | 1.093 | 0.832 | 1.329 |
| $Nb^3$ | 0.052 | 0.138 | 0.014 | 0.338 |
| MOR/E × $10^2$ | 0.170 | 0.120 | 0.217 | 0.092 |
| $TSL_{200}$ (° C.) | 1218 | 967 | 1325 | 887 |
| $TSL_{500}$ (° C.) | 1382 | 1158 | 1486 | 1079 |

Inorganic raw materials, pore formers, and solid and liquid organic additives were weighed in the proportions given in the tables, mixed with distilled water, and blended in a Littleford horizontal plough mixer to provide a plasticized batch. The material was subsequently loaded into a ram or twin-screw type extruder, de-aired using a vacuum system, and extruded through a die to form 2-inch or 5.66-inch diameter honeycomb product with the various cell geometries listed in the tables. Parts were cut to approximately 8-inch lengths and partially dried in a microwave dryer, followed by complete drying in a convection oven. The dried parts were cut to 6-inch to 7-inch lengths and fired vertically in an electric or gas furnace. Specific firing conditions relevant to the physical properties of each sample are indicated in the tables. Firing rates are in units of ° C./hour. Rates through other portions of the firing cycle were selected so as to prevent cracking of the ware and are well known in the art.

Closed frontal area was calculated from the relation CFA=(bulk specimen density, in g/cm$^2$)/{(2.51)[1−(% porosity/100)]}.

Porosity was measured by mercury porosimetry, and % porosity and values of the pore diameters at 1, 2, 5, 10, 25, 50, 75, 90, 95, 98, and 99% of the pore size distribution, on a volumetric basis, are provided in the tables.

Coefficients of thermal expansion (CTE) represent the mean CTE's between the indicated temperatures (° C.) and were measured by dilatometry on axial specimens.

As described in United States Patent Application Publication Number 2008/0032091 which is incorporated herein, transverse and axial I-ratios represent the degree of non-random cordierite crystal orientation in the fired ware.

Weight percentages of residual mullite, spinel+sapphirine, and alpha-alumina in the fired samples were measured by x-ray diffractometry. The amount of spinel and sapphirine are included together due to the potential difficulty in distinguishing between the two phases, depending upon the XRD technique used.

Modulus of rupture (MOR) was measured in the axial direction using the four-point beam bending method.

Elastic modulus was measured in the axial direction using a sonic resonance technique. The microcrack index, $Nb^3$, was determined by the method described in United States Patent Application Publication Number 2008/0032091.

The thermal shock parameter, $TSP_{200}$, was computed as $200+(MOR/E)(CTE_{200\text{-}1000})^{-1}$, as defined previously. Also calculated was another thermal shock parameter, $TSP_{500}=500+(MOR/E)(CTE_{500\text{-}900^\circ C.})^{-1}$. The value of $TSL_{500}$ provides an estimate of the maximum temperature that the ceramic honeycomb body can withstand when the coolest region elsewhere in the part is at about 500° C.

FIG. 1 is an illustration of the elastic modulus, E (psi), plotted against temperature (° C.), of an embodiment disclosed herein having essentially zero microcracking as indicated by the overlap of the values during heating (filled circles) and cooling (open squares). Dashed lines indicate the value of E at 800° C. during heating, $E_{800}$. The value of E at room temperature prior to heating, $E_{25}$, is denoted by the first (left-most) filled circle.

Figure 2:
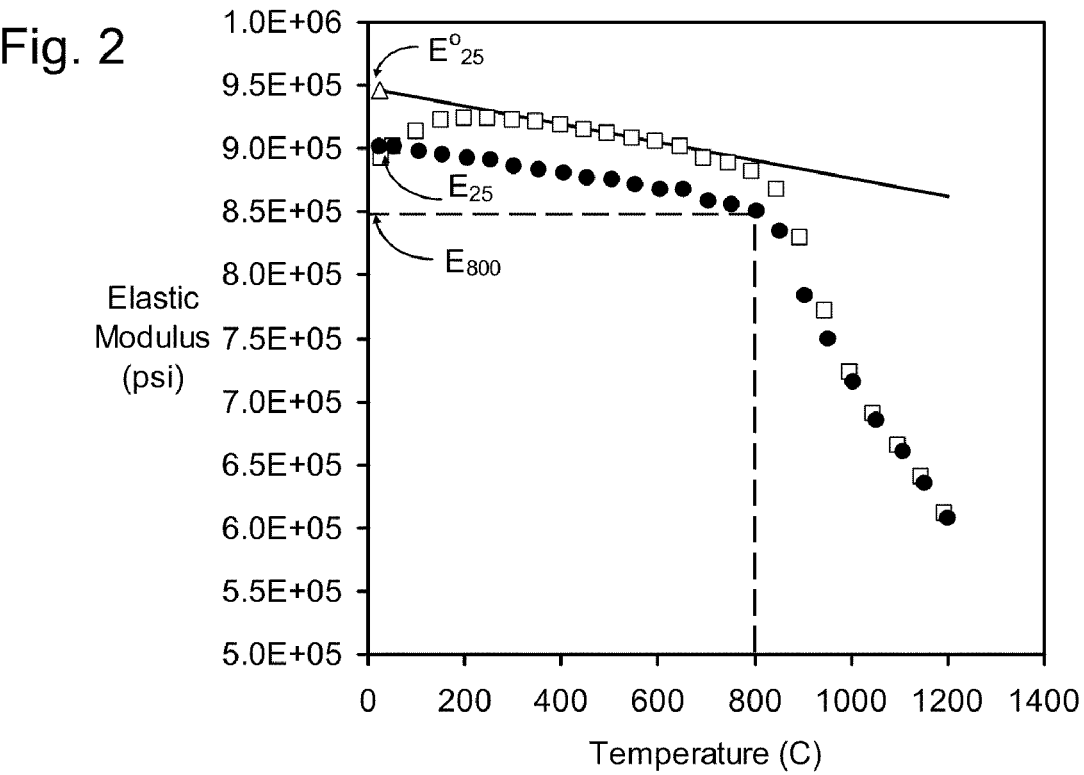
FIG. 2 is an illustration of the elastic modulus, E (psi), plotted against temperature (° C.), of another embodiment disclosed herein which exhibits a small degree of microcracking.

FIG. 2 is an illustration of the elastic modulus, E (psi), plotted against temperature (° C.), of another embodiment disclosed herein which exhibits a small degree of microcracking as indicated by the hysteresis (gap) between the data collected during heating (filled circles) and cooling (open squares). Values of $E_{25}$ and $E_{800}$ are as in FIG. 1. Also indicated is the value of $E°_{25}$ (open triangle), which is the value of a 100.0% non-microcracked specimen.

Figure 3:
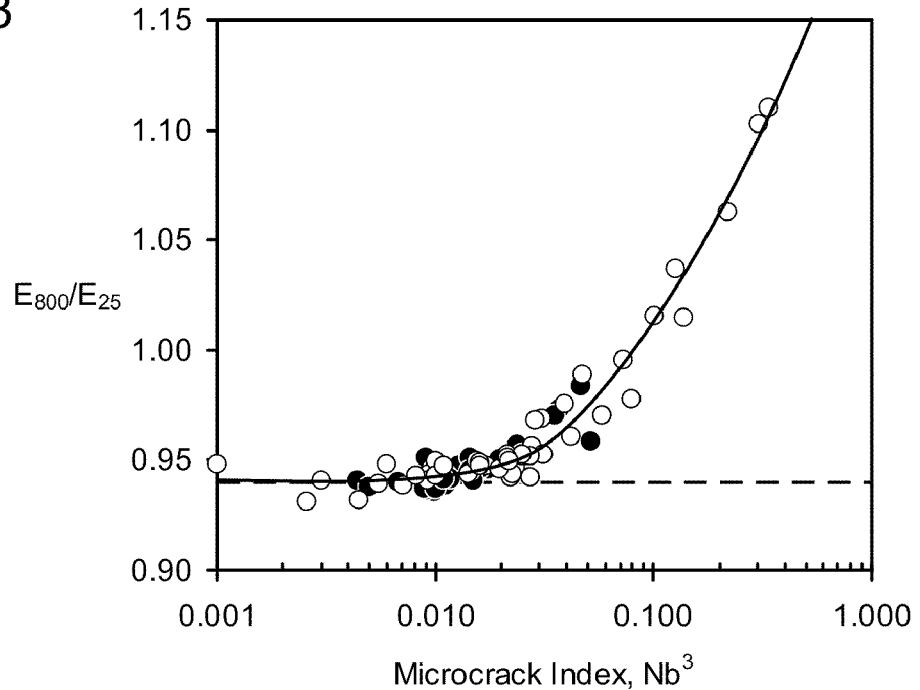
FIG. 3 is an illustration of the elastic modulus ratio $E_{800}/E_{25}$, plotted against the microcrack index, $Nb^3$, of some examples disclosed herein showing that low values of $E_{800}/E_{25}$ correspond to low degrees of microcracking.

FIG. 3 is an illustration of the elastic modulus ratio $E_{800}/E_{25}$, plotted against the microcrack index, $Nb^3$, of some examples disclosed herein showing that low values of $E_{800}/E_{25}$ correspond to low degrees of micro cracking. Dashed line indicates approximate minimum value of $E_{800}/E_{25}$, equal to about 0.94, corresponding to a non-microcracked cordierite ceramic body. Filled circles denote values for as-fired examples, and open circles denote values for examples which were heat treated at 950° C. for 82 hours or for 800-1100° C. for 32.5 hours.

Figure 4:
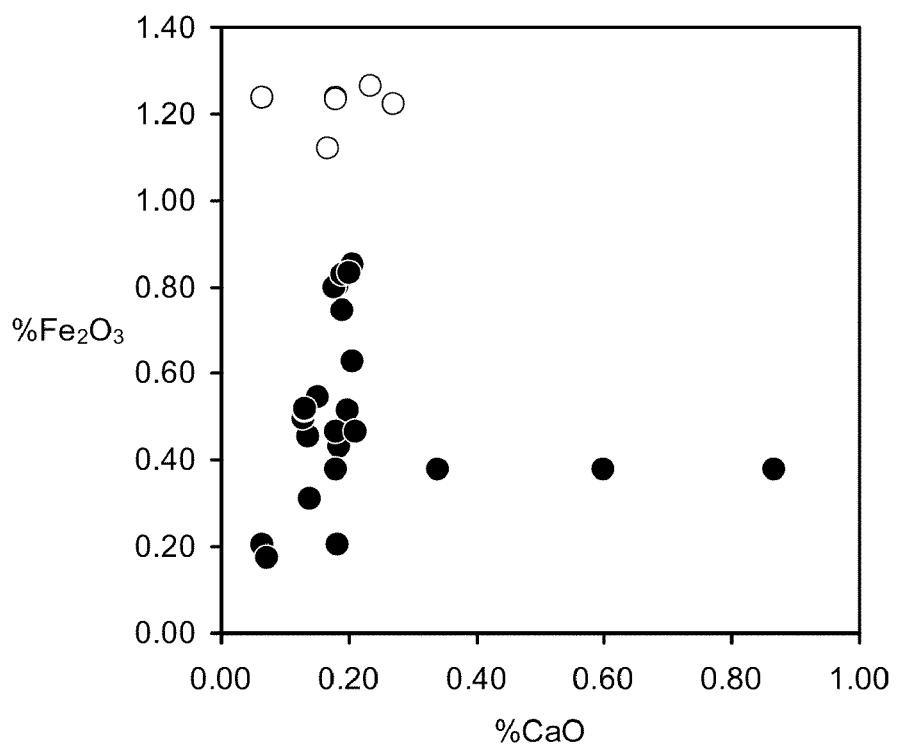
FIG. 4 is an illustration of the estimated wt % of $Fe_2O_3$ plotted against the wt % of CaO for examples.

FIG. 4 is an illustration of the estimated wt % of $Fe_2O_3$ plotted against the wt % of CaO for examples. Solid circles denote examples which also preserve at least 80% of their original MOR after being treated at 950° C. for 82 hours or for 800-1100° C. for 32.5 hours. Open circles denote examples which preserve less than 80% of their original MOR after being treated at 950° C. for 82 hours or for 800-1100° C. for 32.5 hours.

Figure 5:
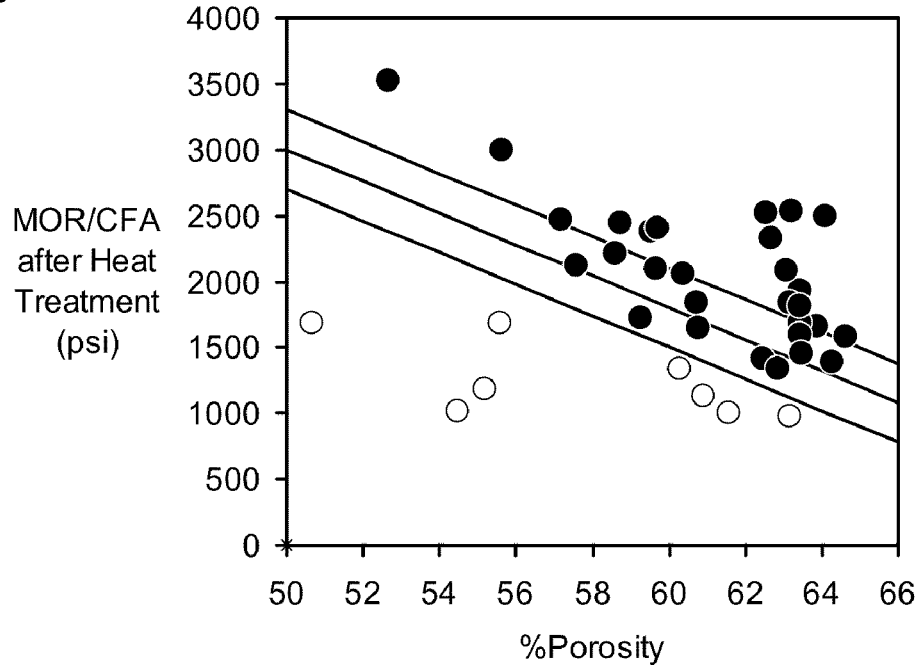
FIG. 5 is an illustration of MOR/CFA of the as-fired ceramic bodies plotted against the % porosity.

FIG. 5 is an illustration of MOR/CFA of the as-fired ceramic bodies plotted against the % porosity. Solid circles denote higher strength and higher porosity examples of the present disclosure. Open circles denote lower strength and/or lower porosity examples. Solid lines indicate boundaries of one set of embodiments having advantageous MOR/CFA.

Figure 6:
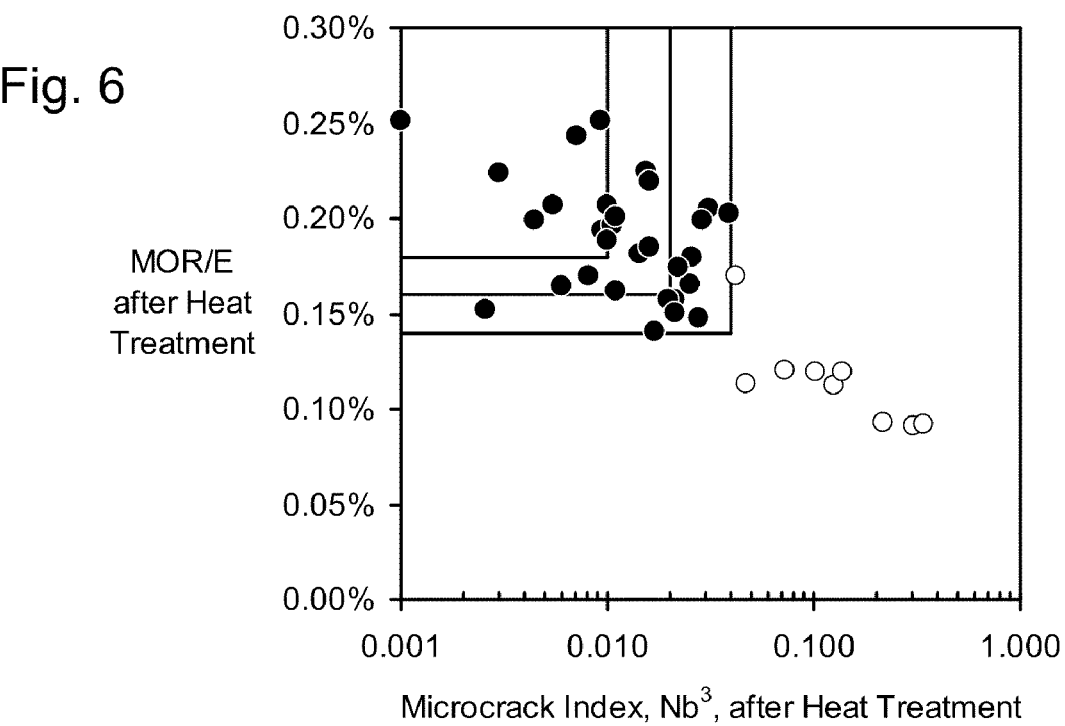
FIG. 6 is an illustration of MOR/E plotted against the microcrack index, $Nb^3$ (x-axis plotted on a logarithmic scale).

FIG. 6 is an illustration of MOR/E plotted against the microcrack index, $Nb^3$ (x-axis plotted on a logarithmic scale). Solid lines indicate boundaries of one set of embodiments having advantageous MOR/E and microcrack index. Symbols are the same as in FIG. 4.

Figure 7:
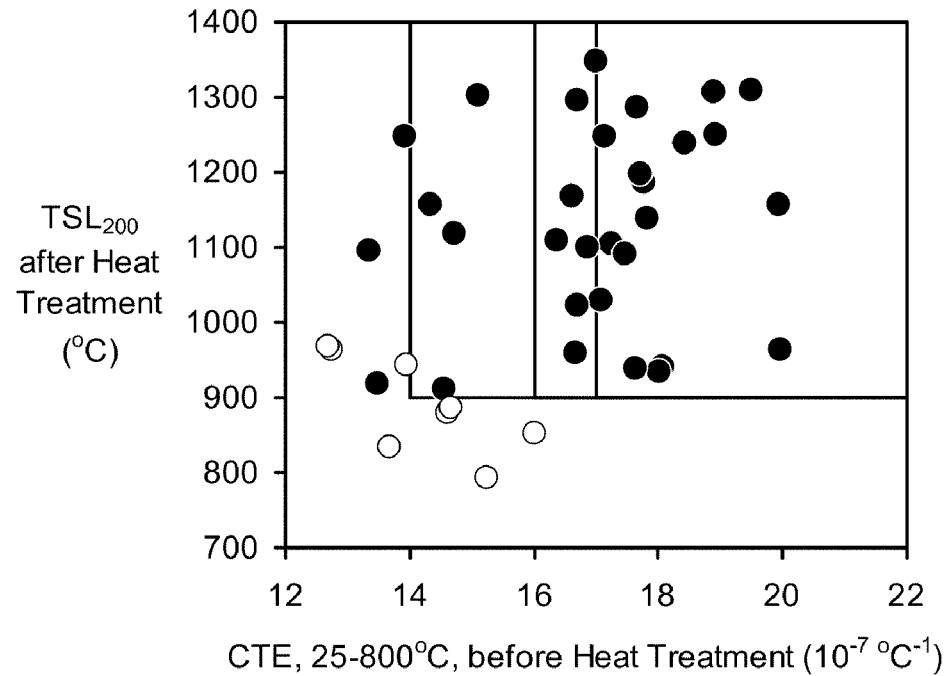
FIG. 7 is an illustration of the predicted thermal shock limit, $TSL_{200}$, of examples which were heat treated at 950° C. for 82 hours or for 800-1100° C. for 32.5 hours, plotted against the coefficient of thermal expansion $CTE_{25-800° C.}$ of the as-fired ceramic bodies.

FIG. 7 is an illustration of the predicted thermal shock limit, $TSL_{200}$, of examples which were heat treated at 950° C. for 82 hours or for 800-1100° C. for 32.5 hours, plotted against the coefficient of thermal expansion $CTE_{25\text{-}800^\circ C.}$ of the as-fired ceramic bodies. Symbols are the same as in FIG. 5.

Figure 8:
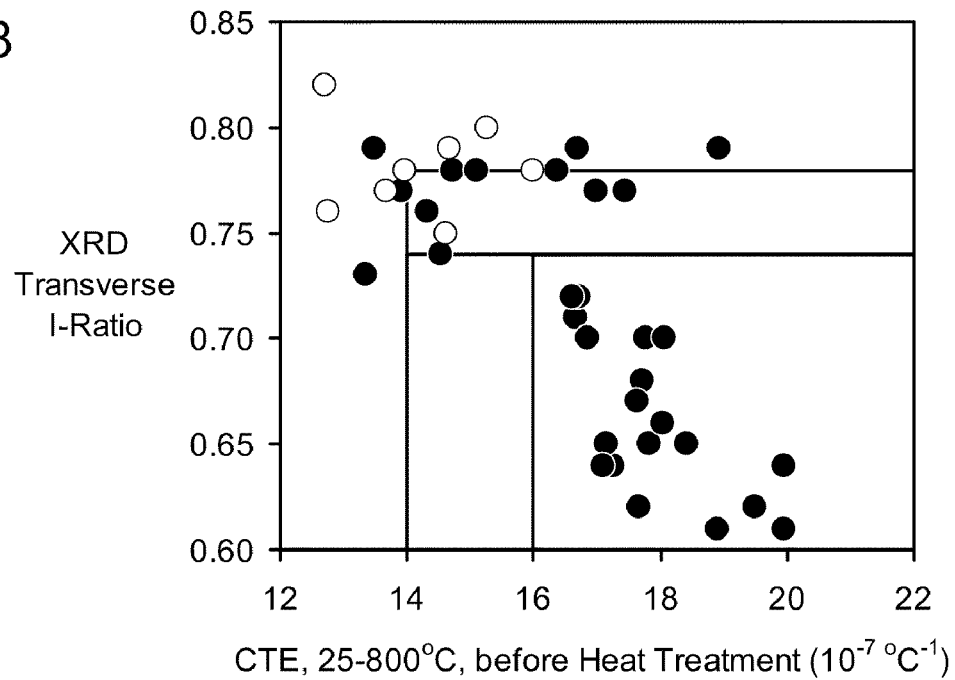
FIG. 8 is an illustration of the XRD transverse I-ratio, $I_T$, plotted against the coefficient of thermal expansion $CTE_{25-800° C.}$ of the as-fired ceramic bodies.

FIG. 8 is an illustration of the XRD transverse I-ratio, $I_T$, plotted against the coefficient of thermal expansion $CTE_{25\text{-}800^\circ C.}$ of the as-fired ceramic bodies. Symbols are the same as in FIG. 5.

Figure 9:
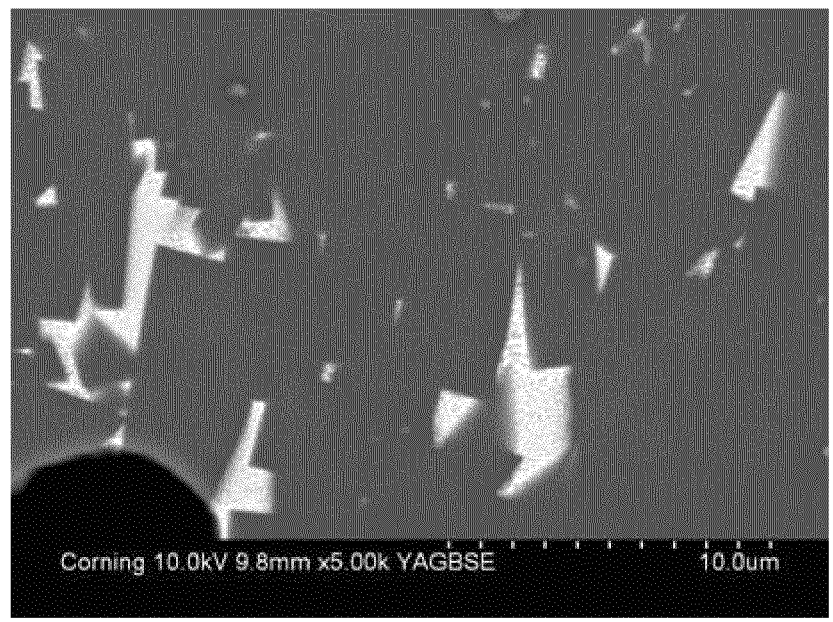
FIG. 9 is a back-scattered electron image of a polished section of yet another embodiment disclosed herein showing the presence of a lanthanum-containing glass phase (bright regions) between prismatic cordierite crystallites (gray).

FIG. 9 is a back-scattered electron image of a polished section of yet another embodiment disclosed herein showing the presence of a lanthanum-containing glass phase (bright regions) between prismatic cordierite crystallites (gray). Black region in lower left corner is a pore. The lanthanum-rich glass phase also contains very small droplets (gray) of a lanthanum-poor glass.

Figure 10:
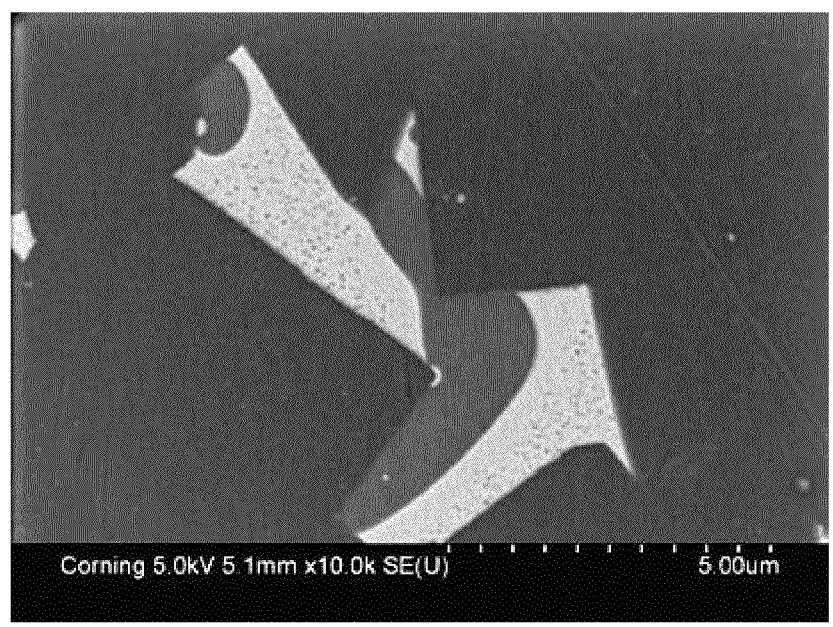
FIG. 10 is a secondary electron image of a polished section of the embodiment of FIG. 9, at higher magnification, after heat treatment at 950° C. for 82 hours.

FIG. 10 is a secondary electron image of a polished section of the embodiment of FIG. 9, at higher magnification, after heat treatment at 950° C. for 82 hours. Medium gray matrix is cordierite. Angular regions contain a lanthanum-rich low-silica glass (bright phase) and a lanthanum-poor high-silica glass (slightly lighter gray than surrounding cordierite).

Figure 11:
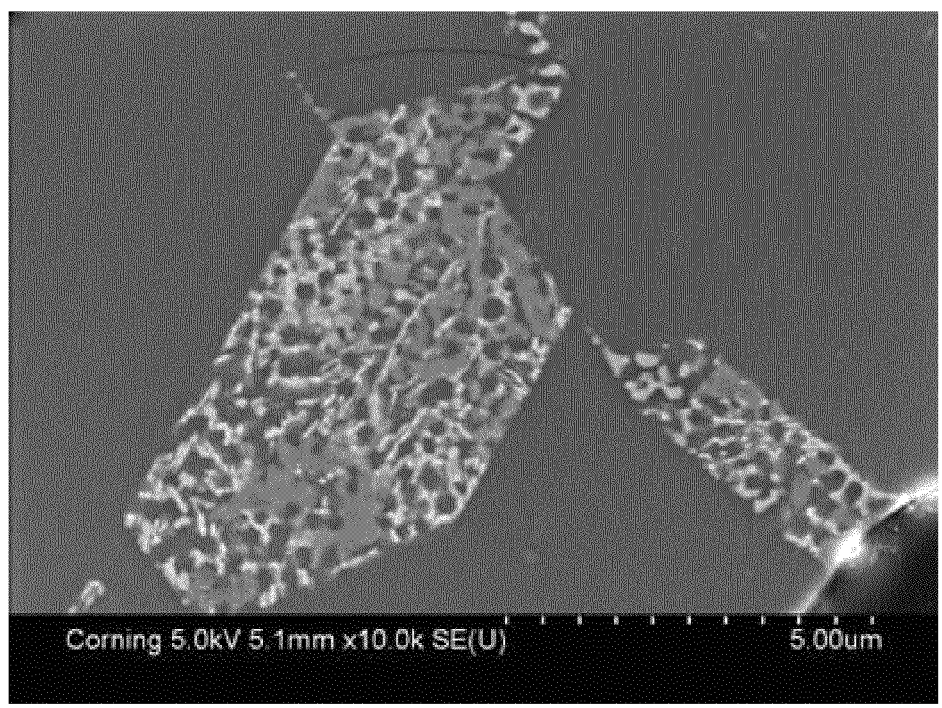
FIG. 11 is a secondary electron image of a polished section of a more iron-rich embodiment disclosed herein after heat treatment at 950° C. for 82 hours.

FIG. 11 is a secondary electron image of a polished section of a more iron-rich embodiment disclosed herein after heat treatment at 950° C. for 82 hours. Medium gray matrix is cordierite. Angular regions contain former glassy regions which have substantially devitrified into at least two crystalline phases (light gray and very light gray), with small scattered residual spherical droplets of silica-rich glass.

Examples 1A through 8B (Tables 10, 11 and 12) demonstrate bodies disclosed herein produced by the addition of 1.0 wt % $La_2O_3$ to a batch based upon a chlorite having low iron and low calcium contents, alumina, and quartz, in some cases with various additions of iron oxide, calcium carbonate, titanium oxide, and combinations thereof. Examples 1B through 6B illustrate that the combination of properties are maintained after exposure to 950° C. for 82 hours. High strengths and low microcrack indices are exhibited by Examples 1B to 4B, which do not contain additional iron oxide. High calculated thermal shock limits are also retained for Examples 2B and 4B, which contain additions of calcium but do not contain additional iron oxide. By contrast, Examples 5B to 8B, which contain additional iron oxide, tend to exhibit a higher microcrack index after heat treatment, lower strength and/or lower values of $TSL_{200}$. The combination of calcium and iron additions (Examples 7B and 8B) is especially detrimental to strength retention as compared to; for example, the addition of calcium without iron, and Example 7B and 8B no longer exhibits a microcrack index $\leq 0.08$, and not even less than 0.10. The benefits of $CaO \geq 0.05$ wt % with $Fe_2O_3 \leq 0.60$ wt % are illustrated in FIGS. 4 to 6. Higher amounts of CaO in combination with higher amounts of $Fe_2O_3$ can result in lower strength, lower $TSL_{200}$, and/or a higher degree of microcracking after heat treatment, as seen for example by Examples 5B, 6B, 7B, 8B, 13B and 14B; the combined wt % of $Fe_2O_3$ and CaO in the respective ceramic bodies in these examples was 1.301, 1.300, 1.416, 1.415, 1.499, and 1.492, while the remaining exemplary examples had combined wt % of $Fe_2O_3$ and CaO less than 1.30. Thus, in some embodiments, the ceramic body contains less than 1.5 wt % $Fe_2O_3$; in some embodiments, the ceramic body contains greater than 0.05 wt % CaO. In some embodiments, the ceramic body contains less than 1.5 wt % $Fe_2O_3$ and greater than 0.05 wt % CaO; in some of these embodiments, the total combined amount of $Fe_2O_3$ and CaO in the ceramic body is less than 1.40 wt %, preferably less than 1.35, more preferably less than 1.30, and in some embodiments less than 1.25, and in some of these embodiments less than 1.00 wt %.

Examples 9A to 14C (Tables 12, 13 and 14) provide bodies disclosed herein made by the addition of 1.0 wt % $La_2O_3$ to mixtures of either high-iron or low-iron talc with alumina, boehmite, and quartz, in some cases with addition of either attapulgite or bentonite which provide additional calcium and iron, among other metal oxides. FIG. 9 shows the distribution of the lanthanum-containing glassy phase in Example 9A. After exposure to 950° C. for 82 hours, Examples 9B and 10B, which have low iron contents, exhibit high strengths, low microcrack indices, and high values of $TSL_{200}$. FIG. 10 shows that much of the glassy phase in Example 9B has further separated into two glasses of different composition, but has not devitrified. Example 11B, which contains high iron with an intermediate amount of calcium oxide, is inferior to Examples 9B and 10B, but still retains satisfactory values of strength, microcrack index, and $TSL_{200}$. Examples 13B and 14B, which have the combination of higher iron and higher calcium, have undergone extensive microcracking after exposure to 950° C. for 82 hours, with very substantial loss in strength, strain tolerance, and $TSL_{200}$. FIG. 11 shows that the glassy phase in Example 14B has largely devitrified into at least two crystalline phases. The results for Examples 9B to 14B are also illustrated in FIGS. 4 to 6, showing the benefits of low iron content on thermal stability. Results for Examples 9C to 14C, held at 1100° C. for 82 hours, show that degradation in properties is less severe for the compositions higher in iron and calcium than when these compositions are held at 950° C. Without needing to rely on theory, it is proposed that partial resorption of the crystallites in the glass pockets, perhaps accompanied by partial melting, occurs at 1100° C., thereby providing more residual glass after cooling back to room temperature.

Examples 15 and 16 show properties of the bodies disclosed herein, and especially excellent retention of strength, low microcracking, strain tolerance, and $TSL_{200}$ after exposure to 950° C. for 82 hours, are achieved for lanthanum-containing raw material combinations that comprise magnesium hydroxide and kaolin and also contain $\leq 0.6$ wt % $Fe_2O_3$ and $\geq 0.10\%$ CaO.

Examples 17A to 19A show that properties for bodies disclosed herein are achieved for lanthanum-containing raw material combinations containing spinel and kaolin. Low levels of microcracking are maintained after exposure to 950 or 1100° C. for 82 hours due to $Fe_2O_3 \leq 0.90\%$ and $CaO \geq 0.10\%$.

Examples 44 and 45 are comparative examples containing essentially no lanthanum (or lanthanum oxide). Very high values of microcracking resulted after heat treatment.

Thus, embodiments of the ceramic bodies disclosed herein can provide increased strength for a given cell geometry, % porosity, and pore size distribution over known cordierite ceramic articles that are lacking sufficient lanthanum to provide extremely low microcracking. Some embodiments that possess low iron content exhibit improved retention of strength and predicted thermal shock resistance after prolonged exposure at high temperature relative to known cordierite ceramics which lack lanthanum or contain high amounts of iron.

Numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

What is claimed is:

1. A ceramic body comprising a predominant cordierite ceramic phase and at least about 0.1 wt % lanthanum oxide contained within the microstructure of the ceramic, the article exhibiting: a four-point beam bending modulus of rupture at 25° C. (room-temperature), MOR; a room-temperature elastic modulus E as measured by a sonic resonance technique at 25° C.; and a coefficient of thermal expansion $CTE_{200\text{-}1000}$ from 200° C.-1000° C. in units of ° $C.^{-1}$; wherein the ceramic body is characterized by a dimensionless strain tolerance, defined by a ratio MOR/E, and a thermal shock resistance, defined by $TSL_{200}=200°$ C.$+(MOR/E)/CTE_{200-10000}$, wherein the ceramic body exhibits MOR/E$>0.12\times10^{-2}$ and $TSL_{200}\geqq900°$ C. after being at room temperature and then being subjected to a heat treatment including being exposed to an environment with a temperature in a range of 800° C. to 1100° C. for at least 25 hours; and wherein the ceramic body contains 0.02 wt % or more of CaO.

2. The ceramic body of claim 1 wherein the heat treatment comprises exposing the ceramic body to either an environment with a temperature of 950° C. for at least 80 hours, or to an environment with a temperature of 1100° C. for at least 80 hours, or to an environment with a temperature of between 800 and 900° C. for at least 20 hours and between 900 and 1000° C. for at least 5 hours and between 1000 and 1100° C. for at least 2 hours.

3. The ceramic body of claim 1 wherein the ceramic body exhibits MOR/E$\geqq0.16\times10^{-2}$ or $TSL_{200}\geqq1000°$ C. after the heat treatment.

4. The ceramic body of claim 1 wherein the ceramic body exhibits MOR/E$\geqq0.18\times10^{-2}$ or $TSL_{200}\geqq1100°$ C. after the heat treatment.

5. The ceramic body of claim 1 wherein the ceramic body exhibits MOR/E$\geqq0.20\times10^{-2}$ or $TSL_{200}\geqq1200°$ C. after heat treatment.

6. The ceramic body of claim 1 wherein the ceramic body exhibits a ratio $MOR_f/MOR_i\geqq0.60$, wherein $MOR_f$ is the MOR after the heat treatment and $MOR_i$ is the MOR at room-temperature before the heat treatment.

7. The ceramic body of claim 1 wherein the ceramic body, after being at room temperature and then being subjected to an environment with a temperature of 1100° C. for at least 80 hours, exhibits MOR/E$\geqq0.12\times10^{-2}$ and $TSL_{200}\geqq900°$ C.

8. The ceramic body of claim 1 wherein the ceramic body contains 1.0 wt % or less of $Fe_2O_3$.

9. The ceramic body of claim 8 wherein the ceramic body contains 0.10 wt % or more of CaO.

10. The ceramic body of claim 1 wherein the ceramic body contains 0.60 wt % or less of $Fe_2O_3$ and 0.10 wt % or more of CaO.

11. The ceramic body of claim 1 wherein the ceramic body has a total porosity ("% porosity") as measured by mercury porosimetry, and the ceramic body has a honeycomb structure with a plurality of channels, the structure having an end with a frontal open area and a closed frontal area (CFA), and wherein MOR/CFA $\geqq\{8700-120(\%\text{ porosity})\}$, in psi, after being at room temperature and then subjected to the heat treatment, wherein the heat treatment comprises exposing the ceramic body either to air at a temperature of 950° C. for at least 80 hours or to an environment with a temperature of between 800 and 900° C. for at least 20 hours and between 900 and 1000° C. for at least 5 hours and between 1000 and 1100° C. for at least 2 hours.

12. The ceramic body of claim 1 wherein the as-fired ceramic body at room-temperature and prior to the heat treatment exhibits $Nb^3\leqq0.08$.

13. The ceramic body of claim 1 wherein the ceramic body exhibits $Nb^3\leqq0.04$ after the heat treatment.

14. The ceramic body of claim 1 wherein the ceramic body has a total porosity of greater than or equal to 50% as measured by mercury porosimetry.

15. The ceramic body of claim 1 wherein the ceramic body contains between 0.3 and 5 wt % lanthanum oxide.

16. The ceramic body of claim 1 wherein the ceramic body contains between 0.5 and 2 wt % lanthanum oxide.

17. A ceramic body comprising a predominant cordierite ceramic phase and at least about 0.1 wt % lanthanum oxide contained within the microstructure of the ceramic, the article exhibiting: a coefficient of thermal expansion $CTE_{25-800}$ greater than $14.0\times10^{-7°}$ C.$^{-1}$ from 25° C.-800° C.; an elastic modulus ratio $E_{800}/E_{25}\leqq1.00$; a four-point beam bending modulus of rupture at 25° C. (room-temperature), MOR; and a room-temperature elastic modulus E as measured by a sonic resonance technique at 25° C.; wherein the ratio MOR/E is a dimensionless strain tolerance, and MOR/E$\geqq0.10\%$; and wherein the ceramic body contains 0.02 wt % or more of CaO.

18. The ceramic body of claim 17 wherein the ceramic body exhibits a coefficient of thermal expansion $CTE_{200-1000}$ from 200° C.-1000° C. in units of ° C.$^{-1}$, and a thermal shock resistance greater than or equal to 800° C., wherein the thermal shock resistance is 200° C.$+(MOR/E)/CTE_{200-1000}$.

19. The ceramic body of claim 17 wherein the ceramic body contains between 0.3 and 5 wt % lanthanum oxide.

20. The ceramic body of claim 17 wherein the ceramic body has a total porosity of greater than or equal to 50% as measured by mercury porosimetry.

21. The ceramic body of claim 17 wherein the ceramic body exhibits an elastic modulus ratio $E_{900}/E_{25}\leqq0.96$.

22. The ceramic body of claim 17 comprising an XRD "transverse I-ratio" of less than 0.78.

23. The ceramic body of claim 22 wherein the transverse I-ratio is not more than 0.74.

24. A ceramic body comprising a predominant cordierite ceramic phase and at least about 0.1 wt % lanthanum oxide contained within the microstructure of the ceramic, the article exhibiting: a four-point beam bending modulus of rupture at 25° C. (room-temperature), MOR; a room-temperature elastic modulus E as measured by a sonic resonance technique at 25° C.; and a coefficient of thermal expansion $CTE_{200-1000}$ from 200° C.-1000° C. in units of ° C.$^{-1}$; wherein the ceramic body is characterized by a dimensionless strain tolerance, defined by a ratio MOR/E, and a thermal shock resistance, defined by $TSL_{200}=200°$ C.$+(MOR/E)/CTE_{200-1000}$, wherein the ceramic body exhibits MOR/E$>0.10\times10^{-2}$ and $TSL_{200}\geqq800°$ C. after being at room temperature and then being subjected to a heat treatment including being exposed to an environment with a temperature in a range of 800° C. to 1100° C. for at least 25 hours, and wherein the ceramic body contains $Fe_2O_3$ and CaO in a total combined amount of less than 1.40 wt %; and wherein the ceramic body contains 0.02 wt % or more of CaO.

25. The ceramic body of claim 24 wherein the ceramic body contains 1.0 wt % or less of $Fe_2O_3$.

26. The ceramic body of claim 8 wherein the ceramic body contains 0.05 wt % or more of CaO.

27. The ceramic body of claim 24 wherein the ceramic body contains 1.0 wt % or less of $Fe_2O_3$ and 0.10 wt % or more of CaO.

28. The ceramic body of claim 24 wherein the ceramic body contains 0.60 wt % or less of $Fe_2O_3$ and 0.10 wt % or more of CaO.

29. The ceramic body of claim 24 wherein the ceramic body after the heat treatment exhibits $Nb^3\leqq0.10$.

30. The ceramic body of claim 24 wherein the ceramic body after the heat treatment exhibits $Nb^3\leqq0.08$.

31. The ceramic body of claim 24 wherein the heat treatment comprises exposing the ceramic body to either an environment with a temperature of 950° C. for at least 80 hours, or to an environment with a temperature of 1100° C. for at least 80 hours, or to an environment with a temperature of between 800 and 900° C. for at least 20 hours and between 900 and 1000° C. for at least 5 hours and between 1000 and 1100° C. for at least 2 hours.

32. The ceramic body of claim 31 wherein the heat treatment comprises exposing the ceramic body to either an environment with a temperature of about 950° C. for about 82 hours, or to an environment with a temperature of about 1100° C. for about 82 hours.

* * * * *